United States Patent [19]
Hinrichs

[11] Patent Number: 6,082,285
[45] Date of Patent: Jul. 4, 2000

[54] SEA BIRD MARINE CRAFT PROTECTOR

[76] Inventor: Uwe Hinrichs, 30 Mariners La., Northport, N.Y. 11768

[21] Appl. No.: 09/037,125

[22] Filed: Mar. 9, 1998

[51] Int. Cl.$^7$ ........................................................ B63B 8/00
[52] U.S. Cl. ............................................. 114/343; 52/101
[58] Field of Search ........................... D12/317; 114/343, 114/364; 52/107

[56] References Cited

U.S. PATENT DOCUMENTS

| | | | |
|---|---|---|---|
| 4,100,706 | 7/1978 | White | 52/101 |
| 5,216,832 | 6/1993 | Darby | 43/81 |
| 5,341,759 | 8/1994 | Hood | 114/255 |
| 5,410,982 | 5/1995 | Mann | 114/343 |
| 5,476,062 | 12/1995 | Ondris et al. | 114/343 |

FOREIGN PATENT DOCUMENTS

| | | | |
|---|---|---|---|
| 712751 | 11/1995 | European Pat. Off. | B60J 11/00 |
| 3023254 | 1/1982 | Germany | A01M 29/00 |
| 3237840 | 4/1984 | Germany | A01M 29/00 |

*Primary Examiner*—Ed Swinehart
*Attorney, Agent, or Firm*—Harvey Lunenfeld

[57] ABSTRACT

A sea bird marine craft protector having an elevated protector net for preventing sea birds, such as sea gulls and the like, from landing on deck and superstructure of a marine craft and supports or struts for supporting and elevating the protector net above the deck and above the superstructure. The sea bird marine craft protector has fasteners for fastening the protector net to a rail on the deck and fasteners on stern of the marine craft, for pulling the protector net taut, and for maintaining the protector net at a minimum height above the deck and the superstructure. Additionally, the sea bird marine craft protector has strut support mounts, which are mounted on port deck and starboard deck of the marine craft, respectively, for supporting the struts therebetween, maintaining the struts in user selected positions, and for maintaining the minimum height of the protector net above the deck and the superstructure. The protector net is elevated to the minimum height, which is greater than the length of the longest sea bird's legs, that a user intends to protect the marine craft from. The protector net has a mesh, which is smaller than the width of the body of the smallest sea bird, that the user intends to protect the marine craft from and entering and landing therethrough. The minimum height and the mesh may vary, depending upon the user's needs. The sea bird marine craft protector may have a reel for letting out and winding up the protector net.

33 Claims, 23 Drawing Sheets

FIG I

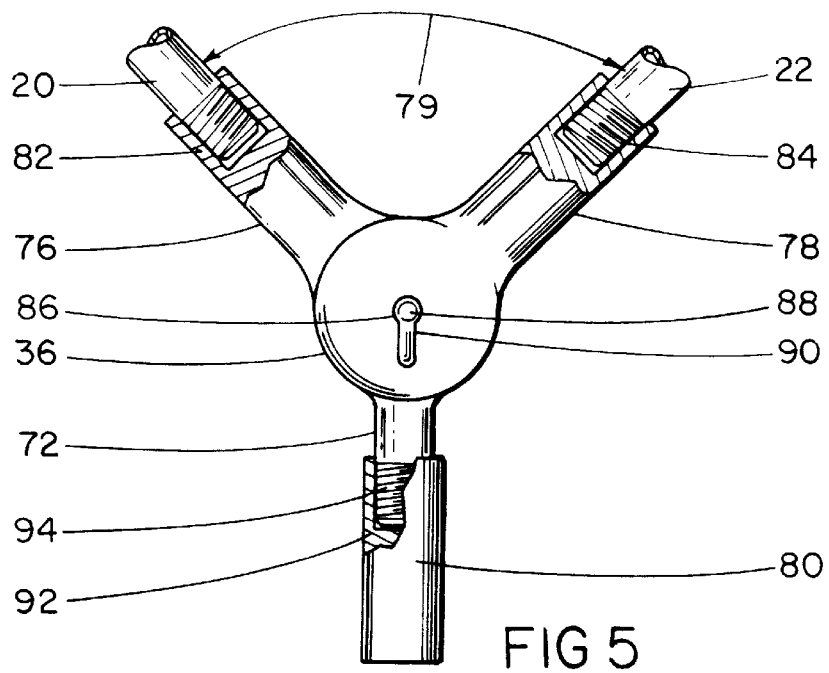
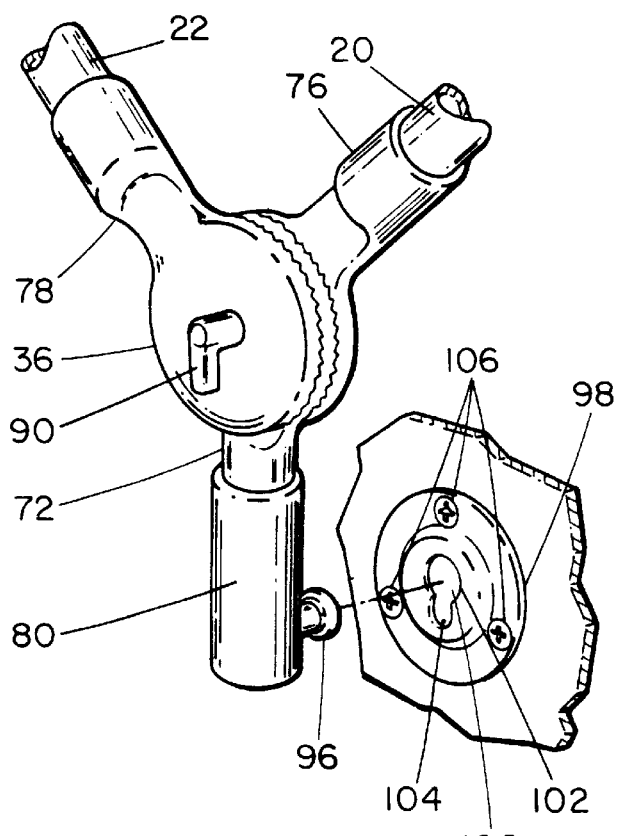
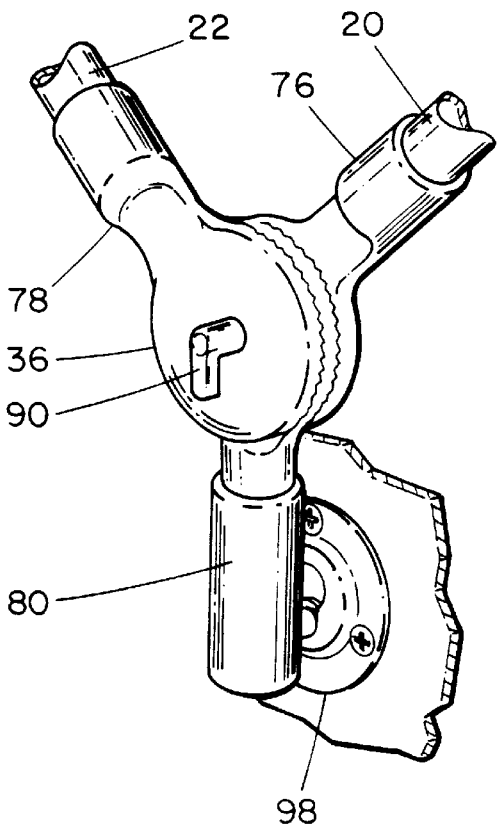
FIG 5
FIG 6
FIG 7

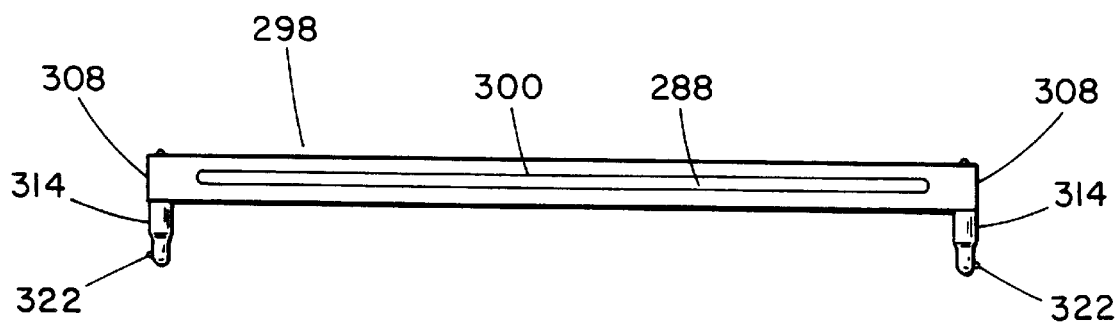
FIG 34
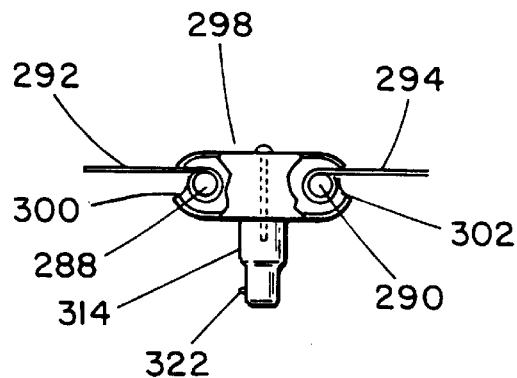 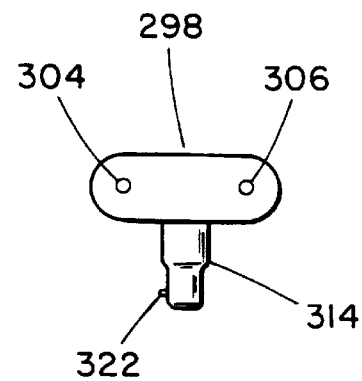
FIG 35  FIG 36
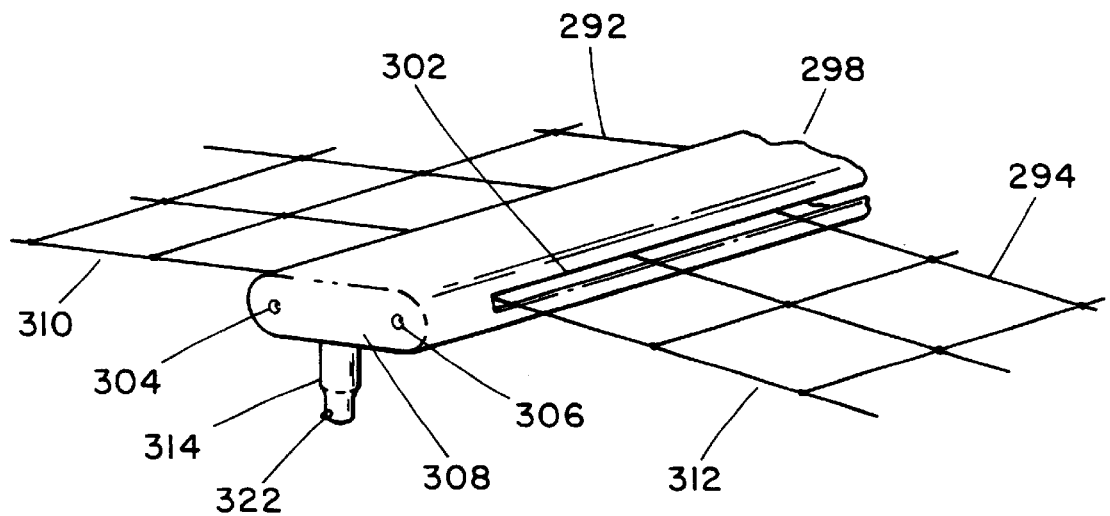
FIG 37

SEA BIRD MARINE CRAFT PROTECTOR

BACKGROUND OF THE INVENTION

1. Field of the Invention

The present invention relates generally to marine craft protectors and more particularly to protectors for preventing sea birds from landing on marine craft.

2. Background Art

Gulls, or sea gulls, are graceful and can be found soaring and gliding in pursuit of food near coastlines. These long winged swimming birds with webbed feet and superb flight and other sea birds, however, have been a significant nuisance to marine craft for centuries. Aside from fly-by droppings, gulls often land on marine craft, especially when such craft are moored and unattended, and deposit excrement wherever they see fit. The birds that frequent the decks and other parts of marine craft leave their excrement messages behind much to the dismay and outrage of owners or skippers of the craft, who upon returning may first react with curses and frustration, only later to attempt to clean up the unsightly and unsanitary excrement mess left behind. Very little, if any, solution has been available, either to the occasional or daily sailor, to prevent these unsanitary, unsightly, and often dangerously slippery conditions, but has cost the deck hand hour upon hour of clean up and maintenance, as well. These conditions persist and impact structures and vehicles of all kinds in coastal areas, from bridges to buildings, navigational aids, to automobiles, boats, and ships.

A Herring Gull, which is a common gull and known in the northeast, has an average length from tip of bill to end of tail of approximately 24 inches, and, in the air, a wing spread of approximately 56 inches from wing tip to wing tip. The gull's legs are 4 to 6 inches long, on the average, with webbed feet, requiring a surface of at least 10 to 15 square inches for landing on.

There is a need for a simple, effective, inexpensive, attractive, easy to install and remove, removably attached, compactly storable, and durable protector for preventing sea birds from landing on and excreting excrement on marine craft.

Different apparatus and methods have heretofore been known. However, none of these adequately satisfies the aforementioned needs. Some of the devices and methods used heretofore in attempts to control sea bird pest problems have included: visual scare apparatus involving moving objects, such as artificial owls or PVC strips, and other devices, which require wind as a driving force; sonics, using audible or ultrasonic devices; cables to deter the sea birds from flying near portions of the marine craft, but not from landing on the marine craft; chemical repellents; and electrical shocking devices. Such devices are often difficult or impractical to use and/or install, and for the most part, only protect a portion of the marine craft some of the time, if at all. None of the aforementioned apparatus or methods have been effective, as the sea gulls and other sea birds have easily adapted to their changing environment and have realized that, for the most part, that such control apparatus is of no real threat to them.

Different sea bird pest control devices have been disclosed.

U.S. Pat. No. 5,216,832 (Darby) discloses a spring actuated animal pest control device, having elements which move rapidly toward an animal which has actuated the device. When an animal, such as a bird, steps upon and actuates the device, two body members connected to spring elements initially move rapidly together at the bird. The motion of the body members and the spring elements are intended to frighten the bird, causing the bird to depart before the spring element contacts the bird. However, the spring elements and/or the body members may contact the bird, as it is departing. The objective of the device is to create a near miss or real physical contact with the bird, thus scaring the bird away from the area to be protected.

U.S. Pat. No. 5,341,759 (Hood) discloses a boat or navigational aid having at least two posts extending upward from the top of the boat or the navigational aid and at least one line between the posts to prevent sea birds from landing on the top of the boat.

U.S. Pat. No. 5,476,062 (Ondris et al.) describes a device intended to prevent birds from flying near and landing on a boat, having a post centrally mounted on the boat with a top end position above the highest point of the boat. A series of cables extends between the top end of the post and peripheral points of the boat. The cables interrupt the flight paths of the birds and are intended to prevent the birds from landing on or flying near the boat. The post can be retracted and the cables can be detached during use of the boat.

German Patent No. DE3237840 (Hechfellner) discloses a device for preventing gulls and other birds from contaminating decks and tarpaulins, particularly of sail boats. The device has rubber lashing ropes with anchor and hoist rings and buttons secured to the boat's tarpaulin. The lashing ropes are pulled taut from an elevated point on the sail boat, such as the mast, to points on the tarpaulin bearing against the boat's sides, and are intended to prevent perching of the birds on the boat.

German Patent No. DE3023254 (Glaettli) discloses apparatus for protecting boats, balustrades, and walls from contamination by animals, particularly birds such as sea gulls, pigeons, and ducks, which tend to perch on such structures. The apparatus comprises an underlay, or the structure to be protected, and electrodes across which voltage is applied and which is placed over the underlay or the structure to be protected. The distance between the electrode wires across which voltage is applied is between 1.5 inches to 2.5 inches, to ensure that a bird trying to land touches both wires and is electrically shocked.

European Patent No. EP712751 (Untersee) describes a protective enclosure for a vehicle or craft, particularly a boat or other weather dependent vehicle. The protective enclosure has an integrated spinous bird guard, at least on its exposed places, when spread out. At least one band of spikes may be located in a region of high exposed edges, the slide fastener, corners, and other parts of the surface of the protective enclosure. The band of spikes may be flexible and may, with the protective enclosure, conform to any form of base. The band of spikes may also be detachable from the protective enclosure.

None of the heretofore known sea bird pest control devices have taken advantage of the sea bird's landing approach patterns and/or physical characteristics.

A flying gull, typically, upon approaching a potential landing site, gives several rapid wing beats, then sails softly down, pausing suddenly over a likely landing spot with a few quick, short beats as the gull's dangling feet touch the landing site on the marine craft, other structure, or the ground. The gull, having webbed feet, requires a large enough location for the gull's webbed feet to fit on, and is generally precluded from landing on and gripping narrow objects, much smaller than the gull's feet.

For the foregoing reasons, there is a need for a simple, effective, inexpensive, attractive, easy to install and remove, removably attached, compactly storable, and durable protector for preventing sea birds from landing on and excreting excrement on marine craft. The sea bird marine craft protector should take advantage of the sea bird's landing and physical characteristics.

SUMMARY

The present invention is directed to a simple, effective, inexpensive, attractive, easy to install and remove, removably attached, compactly storable, and durable protector for preventing sea birds from landing on and excreting excrement on marine craft, and that takes advantage of the sea bird's characteristics.

A sea bird marine craft protector having features of the present invention comprises: an elevated protector net for preventing sea birds from landing on deck and superstructure of a marine craft; at least one support for supporting and elevating the protector net above the deck and above the superstructure; and fasteners for fastening the protector net to the marine craft, for pulling the protector net taut, and for maintaining the protector net elevated above the deck and the superstructure. The sea bird marine craft protector may have a reel for letting out and winding up the protector net.

DRAWINGS

These and other features, aspects, and advantages of the present invention will become better understood with regard to the following description, appended claims, and accompanying drawings where:

FIG. 5 is a front view of a strut mounting assembly for mounting two of the struts on the marine craft;

FIG. 6 is a side view of the strut mounting assembly of FIG. 5, prior to installation in a deck fitting with a front view of the deck fitting;

FIG. 7 is a side view of the strut mounting assembly of FIG. 5 installed in the deck fitting of FIG. 6 on a deck of the marine craft;

FIG. 34 is a front view of a reel housing of the sea bird marine craft protector of FIG. 32;

FIG. 35 is a side section view of the reel housing of FIG. 34, reel, and portions of the protector net;

FIG. 36 is a side view of the reel housing of FIG. 34;

FIG. 37 is a perspective section view of the reel housing of FIG. 34 installed on a strut of the sea bird marine craft protector and portions of the protector net.

DESCRIPTION

The preferred embodiments of the present invention will be described with reference to FIGS. 1–38 of the drawings. Identical elements in the various figures are identified with the same reference numbers.

Figure 1:
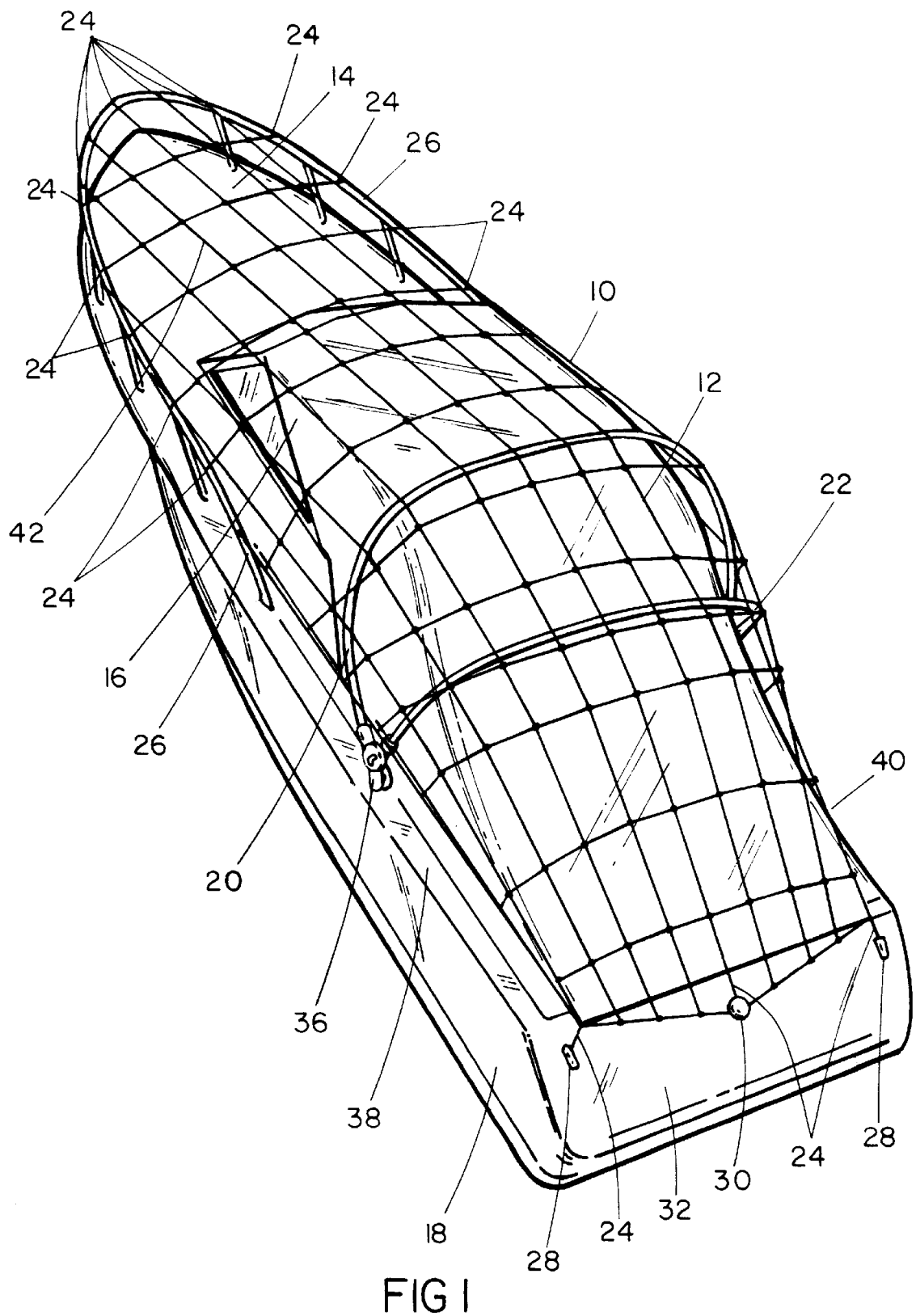
FIG. 1 is a perspective view of a sea bird marine craft protector, constructed in accordance with the present invention, installed on a marine craft.
Figure 2:
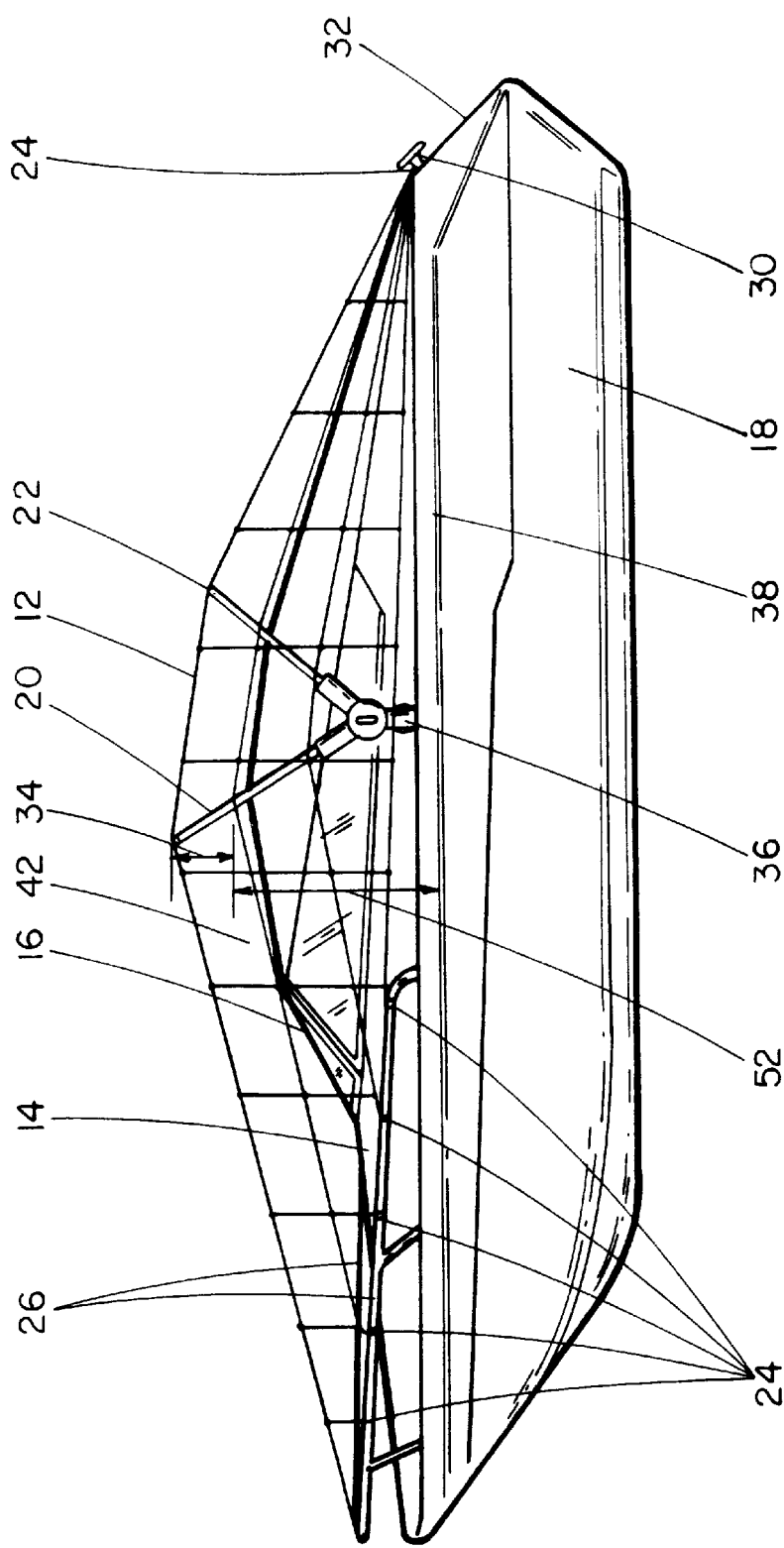
FIG. 2 is a side view of the sea bird marine craft protector of the present invention shown in FIG. 1, installed on the marine craft.

FIGS. 1 and 2 show an embodiment of a sea bird marine craft protector 10, constructed in accordance with the present invention. The sea bird marine craft protector 10 has an elevated protector net 12 for preventing sea birds, such as sea gulls and the like, from landing on deck 14 and superstructure 16 of a marine craft 18 and struts 20 and 22 for supporting and elevating the protector net 12 above the deck 14 and above the superstructure 16.

The sea bird marine craft protector 10 also has fasteners 24 for fastening the protector net 12 to rail 26 on the deck 14 and fasteners 28 and 30 on stern 32 of the marine craft 18, for pulling the protector net 12 taut and maintaining the protector net 12 at a minimum height 34 above the deck 14 and the superstructure 16, when the protector net 12 is pulled taut.

Additionally, the sea bird marine craft protector 10 has strut mounting assemblies 36, which are mounted on port deck 38 and starboard deck 40 of the marine craft 18, respectively, for supporting the struts 20 and 22 therebetween, maintaining the struts 20 and 22 in user selected positions, and for supporting the protector net 12 at the minimum height 34 above the deck 14 and the superstructure 16.

The protector net 12 is elevated to the minimum height 34, which is greater than the length of the longest sea bird's legs, that a user intends to protect the marine craft 18 from. The protector net 12 has a mesh 42, which is smaller than the width of the body of the smallest sea bird, that the user intends to protect the marine craft 18 from and entering and landing therethrough.

Figure 3:
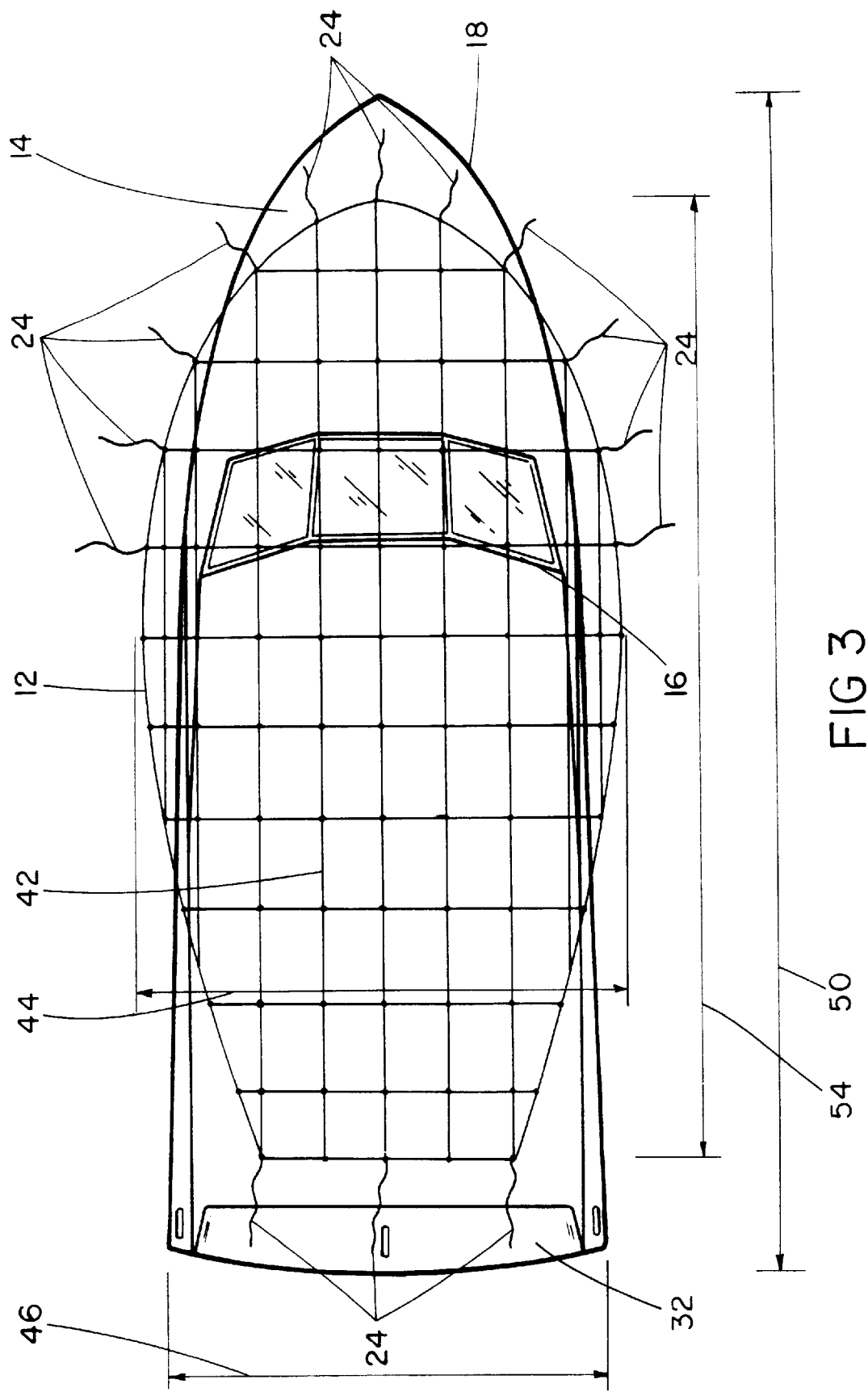
FIG. 3 is a top view of a protector net of the sea bird marine craft protector prior to installation on the marine craft, which is also shown.

FIG. 3 shows the protector net 12, prior to installation on the marine craft 18. Maximum width 44 of the protector net 12 is wider than beam 46 of the marine craft 18, to compensate for perimeter length 48 of the strut 20, which is shown in FIG. 4, and the strut 22, which is substantially the same as the strut 20, after installation on the marine craft 18.

The protector net 12 may be constructed of a resilient material, such as rubber, bungee, braided rubber with a nylon or polypropylene covering, or other suitable material. The protector net 12 may also be constructed of non-resilient material, such as nylon rope, polypropylene rope, rope made of hemp, wire, or other suitable material. Dimensions for the protector net 12 constructed of resilient material of the marine craft 18 having, for example, an overall length 50 of 23 feet, the beam 46 of 7 feet, with the superstructrue 16 having a height 52 of 3 feet above the deck 14, length 54 and the maximum width 44 of the protector net 12 are typically 20 feet by 12 feet, respectively. For non-resilient material, the length 54 of the protector net 12 is typically 5 feet longer than the overall length 50 of the marine craft 18, or 28 feet for the aforementioned example.

Figure 4:
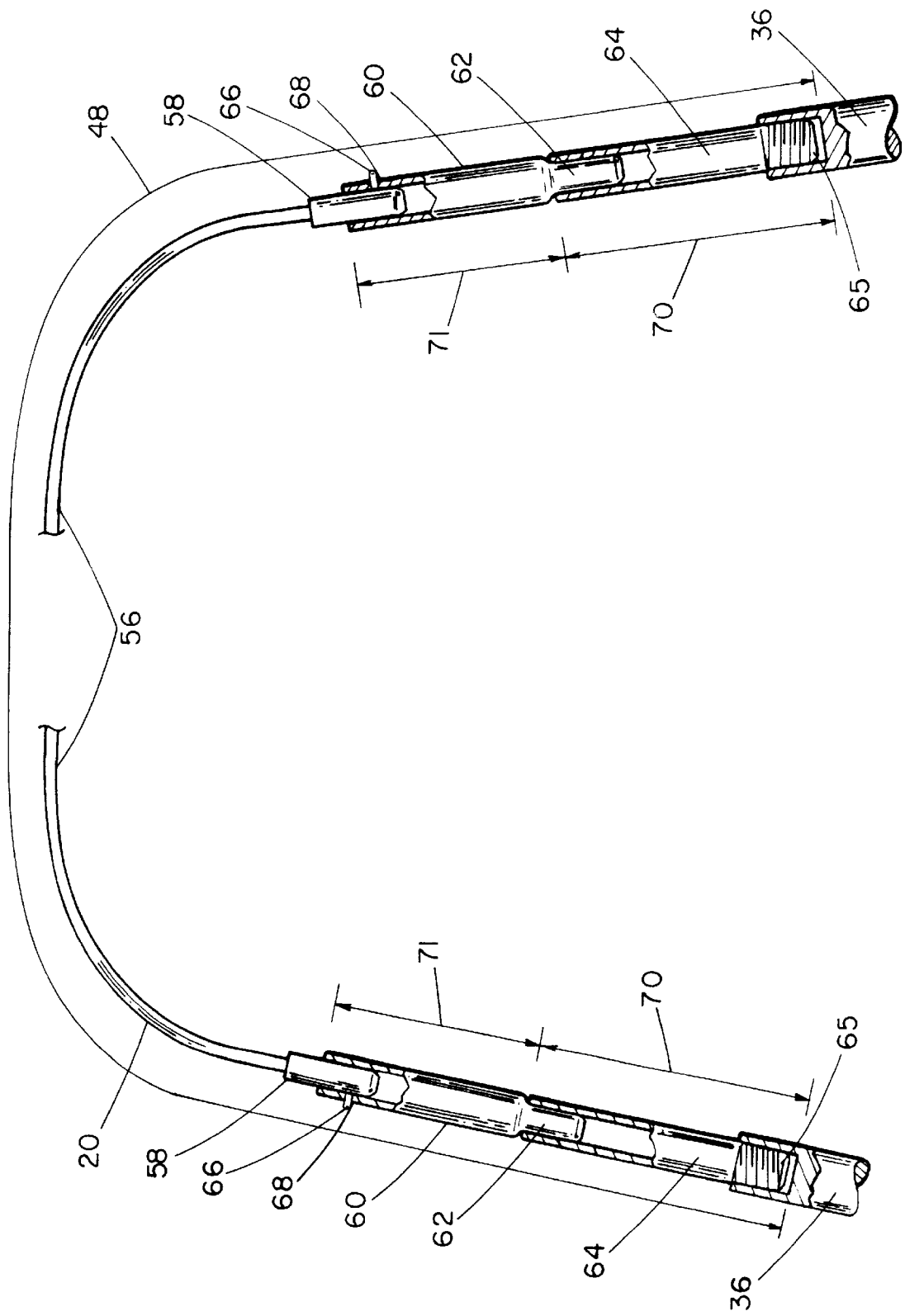
FIG. 4 is a front view of a strut for supporting the sea bird protector net on the marine craft.

The strut 20, shown in FIG. 4, has an arcuate flexible resilient center section 56 with reinforced ends 58 inserted into and fastened to top tubular members 60 having tapered ends 62, which are inserted into and fastened to bottom tubular members 64, respectively. The bottom tubular members 64 have ends 65 threaded or optionally inserted into and supported by the strut mounting assemblies 36, which are mounted on the deck 14 of the marine craft 18. The reinforced ends 58 of the arcuate flexible resilient center section 56 have spring loaded buttons 66, and the top tubular members 60 have holes 68 for receiving the spring loaded buttons 66 therethrough and fastening the reinforced ends 58 to the top tubular members 60.

The strut 22 is substantially the same as the strut 20, except that lengths 70 of the bottom tubular members 64 for the struts 20 and 22, or lengths 71 of the top tubular members 60 of the struts 22 and 20 may be optionally different, depending upon the shape of the superstructure 16. However, in most typical cases, the lengths 70 of the bottom tubular members 64 will be substantially the same for the struts 20 and 22, and the lengths 71 of the top tubular members 60 will be substantially the same for the struts 20 and 22.

The arcuate flexible resilient center section 56 may be of fiberglass, graphite composite rod or other suitable flexible resilient material, and the reinforced ends 58 may be of aluminum, stainless steel, brass, or other suitable corrosion resistant material, which may be adjoined to the arcuate flexible resilient center section 56. The top tubular members 60 and the bottom tubular members 64 may be of aluminum, stainless steel, brass, or other suitable corrosion resistant material. The top tubular member 60 may be optionally interconnected to the respectively bottom tubular member 64 by a resilient cord (not shown) of nylon or other suitable material to facilitate transportation, storage, installation, and removal.

FIGS. 5, 6, and 7 show the strut mounting assembly 36, which has a radially splined center support 72 for adjoining and locking strut receiving members 76 and 78 into rotatably selected position 79, the rotatably selected position 79 being determined by the shape and height 52 of the superstructure 16. The center support 72 is mounted within mount 80. The strut receiving members 76 and 78 each have cups 82 and 84, respectively, for receiving and mounting the struts 20 and 22 therein, respectively. The cups 82 and 84 and the ends 65 of the bottom tubular members 64 may each be optionally threaded, the optionally threaded cups 82 and 84 for matingly receiving the optionally threaded ends 65 and fastening the bottom tubular members 64 of the struts 20 and 22 thereto the strut receiving members 76 and 78 of the strut mounting assembly 36.

The center support 72 and the strut receiving members 76 and 78 each have centrally located holes 86, respectively, for inserting a bolt 88 therethrough and fastening and locking the strut receiving members 76 and 78 into the rotatably selected position 79 on the center support 72 with a receiving wing nut 90. The mount 80 has cup 92 for receiving and mounting male end 94 of the center support 72 therein. The mount 80 also has a screw head shaped hook 96 protruding therefrom for removably mounting and fastening to deck fitting 98, which is adjoined to the deck 14. The deck fitting 98 has keyhole 100 with large hole portion 102 for removably receiving the screw head shaped hook 96 therethrough, and small hole portion edges 104 for removably mounting, resting, and fastening the screw head shaped hook 96 thereto. The deck fitting 98 also has holes for inserting screws 106 therethrough and mounting the deck fitting 98 to the deck 14 therewith. The strut mounting assembly 36 may be of aluminum, stainless steel, brass, or other suitable corrosion resistant material.

The mounting male end 94 of the center support 72 and the cup 92 of the mount 80 may each be optionally threaded, the optionally threaded cup 92 of the mount 80 for matingly receiving and fastening the optionally threaded mounting male end 94 of the center support 72 thereto.

The top tubular members 60, the bottom tubular members 64, the reinforced ends 58, and the strut mounting assemblies 36 are preferably of the same or like materials that are resistant to galvanic action in a marine environment.

Figure 8:
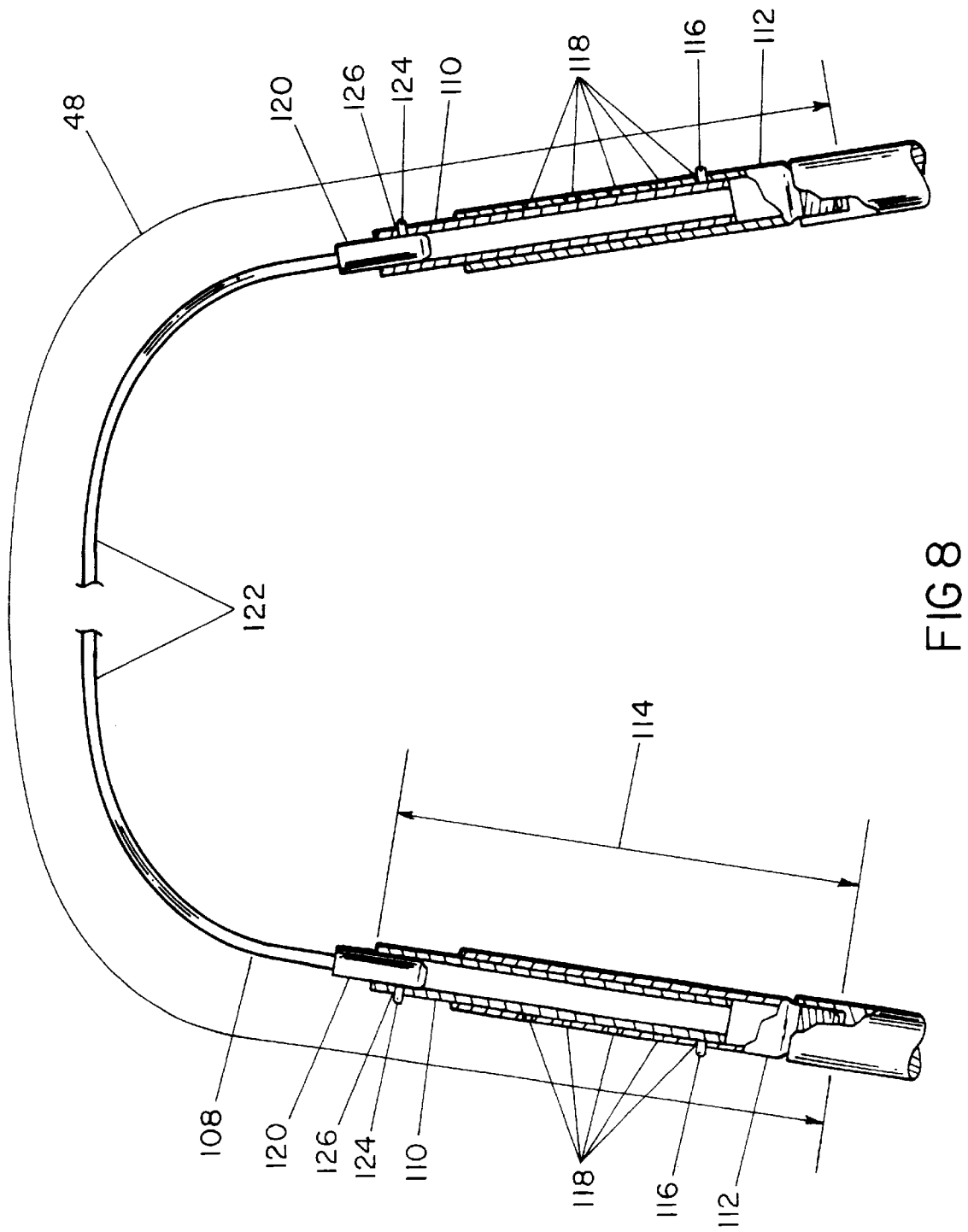
FIG. 8 is a front view of an alternate version of a strut for supporting the sea bird protector net on the marine craft.

An alternate version of a strut 108 shown in FIG. 8 is substantially the same as the strut 20 shown in FIG. 4, except that the strut 108 has upper and lower tubular telescoping members 110 and 112, respectively, for adjusting length 114 and the minimum height 34 of the strut 108 above the deck 14 and the superstructure 16, respectively. The upper tubular members 110 are inserted into the lower tubular members 112, the upper tubular members 110 having spring loaded buttons 116, and the lower tubular members 112 having holes 118 for receiving the spring loaded buttons 116 therethrough and fastening the upper tubular members 110 to the lower tubular members 112. Reinforced ends 120 of arcuate flexible resilient center section 122 have spring loaded buttons 124, and the upper tubular members 110 have holes 126 for receiving the spring loaded buttons 124 therethrough and fastening the reinforced ends 120 thereto.

Figure 9:
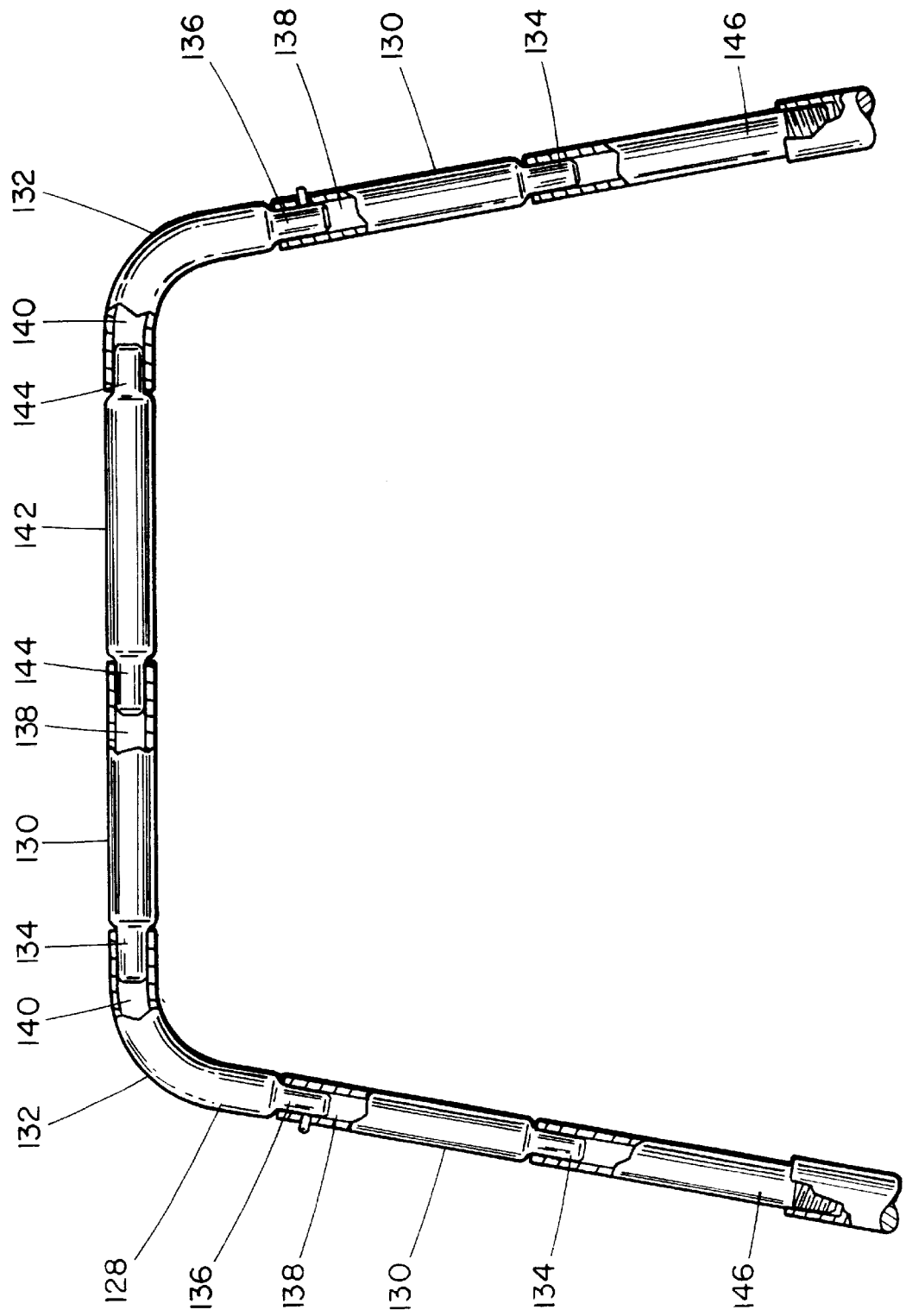
FIG. 9 is a front view of another alternate version of a strut for supporting the sea bird protector net on the marine craft.

An alternate version of a strut 128 shown in FIG. 9 is substantially the same as the strut 20 shown in FIG. 4, except that the strut 128 has a plurality of straight tubular members 130 and arcuate tubular members 132, having tapered ends 134 and 136, respectively, and receiving ends 138 and 140, respectively, and a straight tubular member 142 having two tapered ends 144. The tapered ends 134 of the straight tubular members 130 are inserted into the mating receiving end 140 of one of the arcuate tubular members 132 and into straight tubular bottom members 146; the tapered ends 136 of the arcuate tubular members 132 are inserted into the mating receiving ends 138 of the tubular members 130; and the tapered ends 144 of the straight tubular member 142 are inserted into the mating receiving ends 138 and 140 of one of the straight tubular members 130 and one of the arcuate tubular members 132, respectively, to construct the strut 128. The strut 128 may be of aluminum, stainless steel, brass, or other suitable corrosion resistant material. An optional resilient cord (not shown) drawn internally through the strut 128 and having ends respectively affixed internally to the straight tubular bottom members 146 may be used to maintain the straight tubular member 142, the straight tubular members 130, the arcuate tubular members 132, and the straight tubular bottom members 146 in appropriate interconnection order and grouped for disassembly, storage, loss prevention, and quick and easy assembly.

Figure 10:
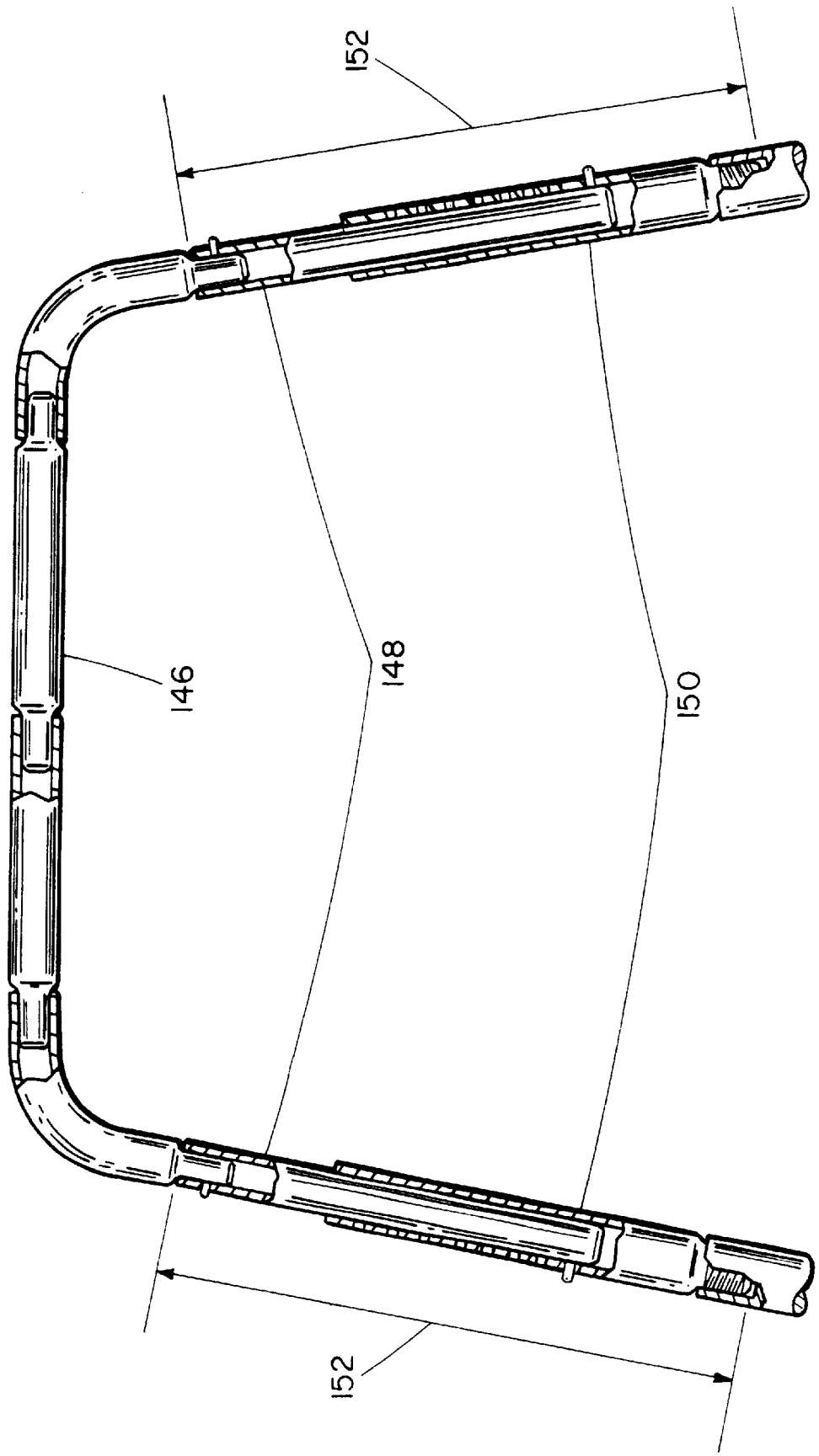
FIG. 10 is a front view of another alternate version of a strut for supporting the sea bird protector net on the marine craft.

An alternate version of a strut 148 shown in FIG. 10 is substantially the same as the strut 128 shown in FIG. 9, except that the strut 148 has upper and lower tubular telescoping members 149 and 150, respectively, for adjusting length 152 and the minimum height 34 of the strut 148 above the deck 14 and the superstructure 16, respectively. The strut 148 may be of aluminum, stainless steel, brass, or other suitable corrosion resistant material. An optional resilient cord (not shown) may also be drawn internally through the strut 148.

Figure 11:
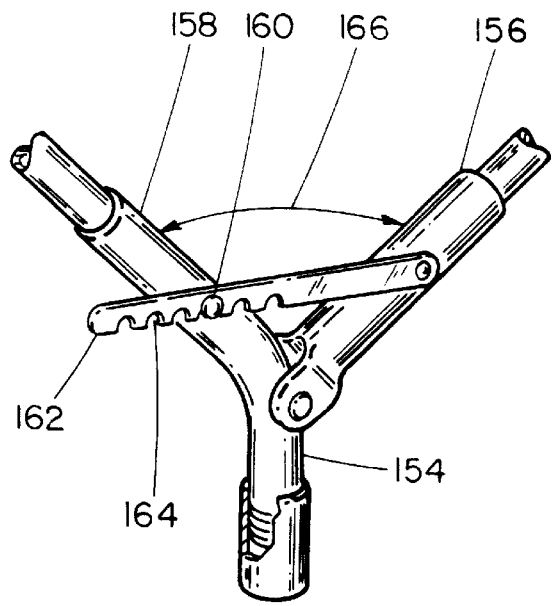
FIG. 11 is a front view of an alternate strut mounting assembly for mounting two of the struts on the marine craft.

An alternate version of a strut mounting assembly 154 shown in FIG. 11 is substantially the same as the strut mounting assembly 36 shown in FIGS. 5, 6, and 7, except that the strut mounting assembly 154 has a hinged strut receiving member 156 pivotally connected to strut receiving support member 158, the strut receiving support member 158 having a screw head shaped hook 160 protruding therefrom. The strut receiving member 156 has a hinged member 162 pivotally connected thereto. The hinged member 162 has notches 164 for latching the hinged member 162 onto the screw head shaped hook 160, fastening the hinged member 162 to the strut receiving support member 158, and locking the strut receiving member 156 and the strut receiving support member 158 at user selected angles 166, which are determined by the location of the notches 164 on the hinged latching member 162. The strut mounting assembly 154 may be of aluminum, stainless steel, brass, or other suitable corrosion resistant material.

Figure 12:
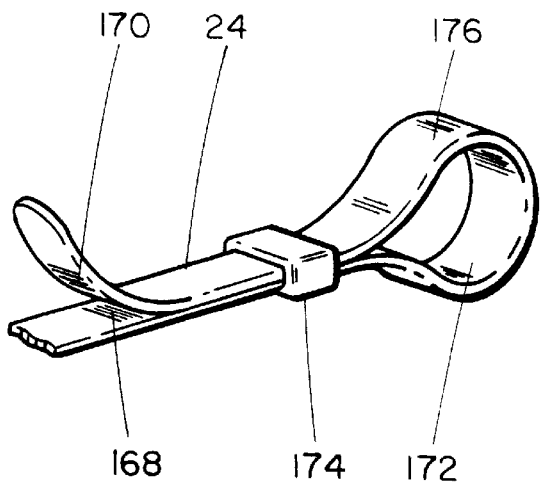
FIG. 12 is a perspective view of a fastener for securing the sea bird protector net to a rail of the marine craft.

The fasteners 24 for fastening the protector net 12 to the rail 26 on the deck 14 and the fasteners 28 and 30 on the stern 32 of the marine craft 18 are shown in FIG. 12. The fastener 24 (shown in a looped configuration) has a plurality of ratchet grooves 168 and ratchet ridges 170 on inner portion 172 that matingly interlock one to the other when the fastener 24 is looped around the rail 26 or around the fasteners 28 and 30 (not shown in FIG. 12) and the interlocking ratchet grooves 168 and the ratchet ridges 170 are matingly pressed together, respectively. A sleeve 174 is removably slid over outer portion 176 of the looped fastener 24 to maintain the matingly pressed together interlocking ratchet grooves 168 and the interlocking ratchet ridges 170, respectively fastened to one another and for installation and removal of the fasteners 24 to or from the rail 26 or the fasteners 28 and 30. The fastener 24 may be of PVC, nylon, or other suitable material.

Figure 13:
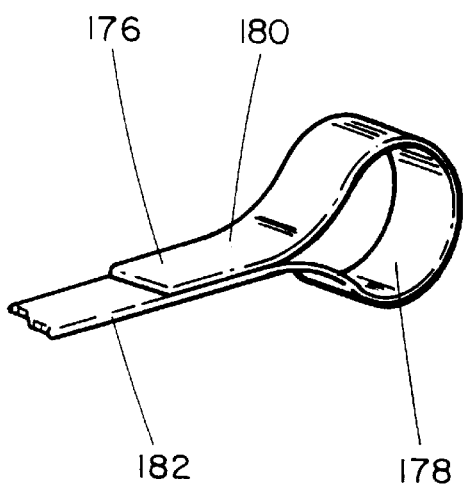
FIG. 13 is a perspective view of an alternate version of a fastener for securing the sea bird protector net to the rail of the marine craft.

An alternate version of a fastener 176 shown in FIG. 13 is substantially the same as the fastener 24 shown in FIG. 12, except that inner portion 178 has a plurality of interlocking hooks and eyes (not shown) for fastening tab 180 to strap 182 when the fastener 176 (shown in a looped configuration) is looped around the rail 26 or around the fasteners 28 and 30 (not shown in FIG. 13) and the interlocking hooks and eyes are matingly pressed together, respectively. The fastener 176 may be of PVC, nylon, or other suitable material.

Figure 14:
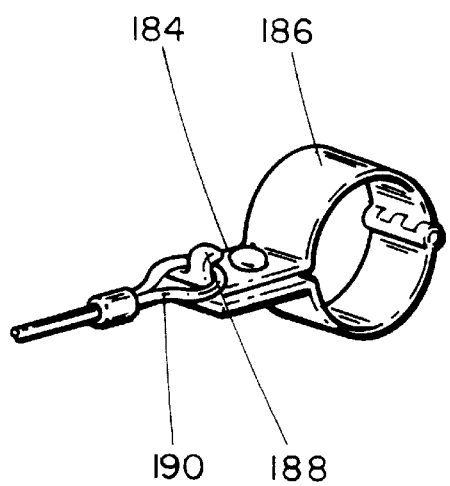
FIG. 14 is a perspective view of an alternate version of a fastener for securing the sea bird protector net to the rail of the marine craft.

An alternate version of a fastener 184 is shown in FIG. 14 having a hinged locking ring 186 for looping around and fastening to the rail 26 thereto (not shown in FIG. 13) and a hook 188 for hooking a looped portion 190 of the protector net 12 thereto. The fastener 184 may be of aluminum, stainless steel, brass, or other suitable corrosion resistant material.

Figure 15:
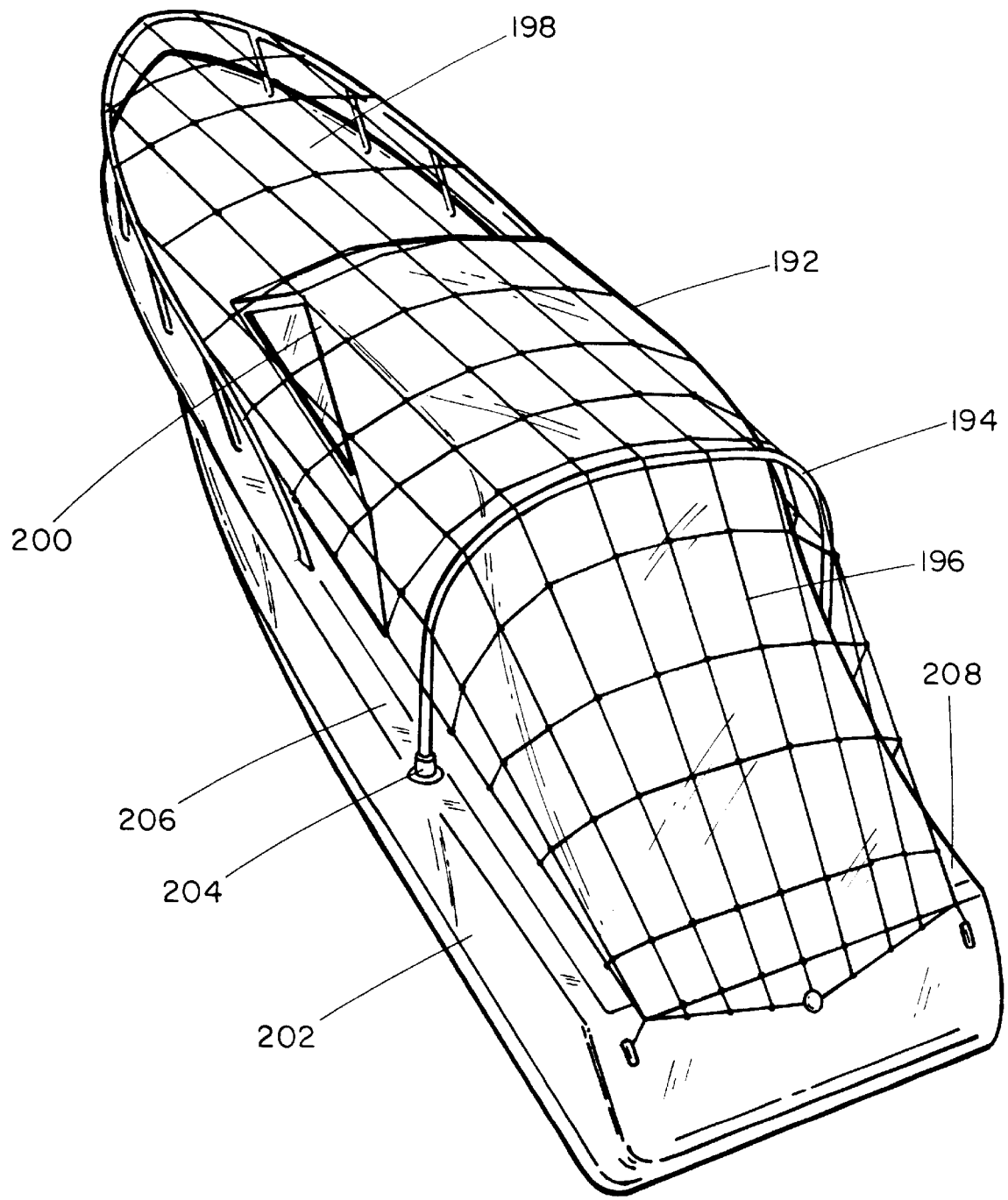
FIG. 15 is a perspective view of an alternate embodiment of a sea bird marine craft protector, constructed in accordance with the present invention, installed on a marine craft.
Figure 16:
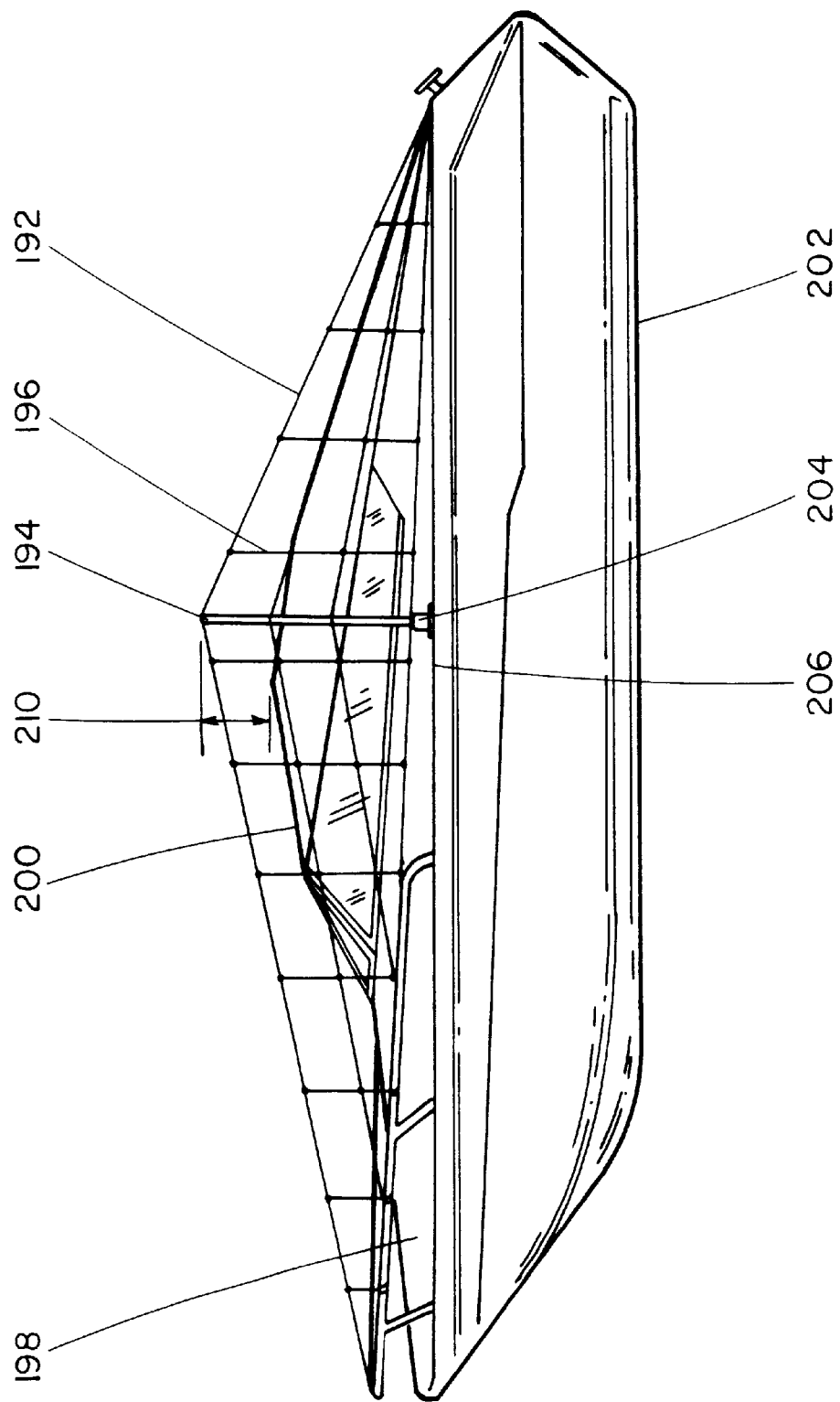
FIG. 16 is a side view of the sea bird marine craft protector of the present invention shown in FIG. 15, installed on the marine craft.

An alternate embodiment of a sea bird marine craft protector 192 shown in FIGS. 15 and 16 is substantially the same as the sea bird marine craft protector 10 shown in FIGS. 1 and 2, except that the sea bird marine craft protector 192 has one strut 194 for supporting and elevating protector net 196 above deck 198 and superstructure 200 of marine craft 202 for preventing sea birds, such as sea gulls and the like, from landing on the deck 198 and the superstructure 200 of the marine craft 202. Additionally, the sea bird marine craft protector 192 has strut support mounts 204, which are mounted on port deck 206 and starboard deck 208 of the marine craft 202, respectively, for supporting the strut 194 therebetween and the protector net 196 at a minimum height 210 above the deck 198 and the superstructure 200.

Figure 17:
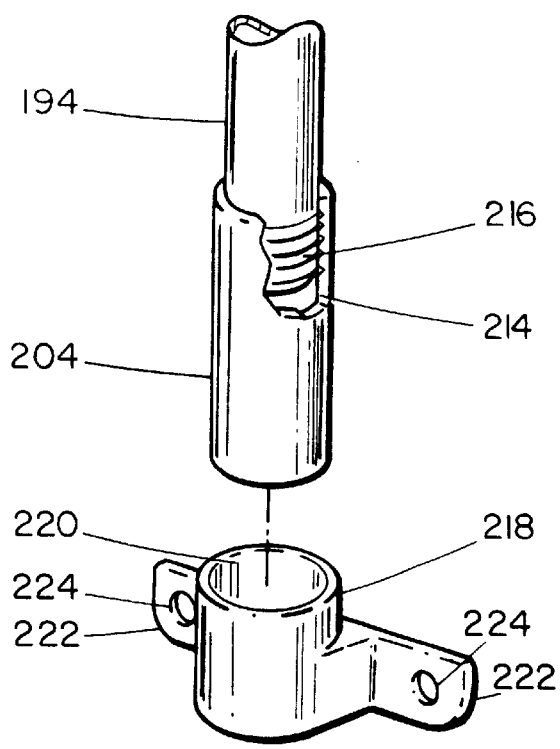
FIG. 17 is a side view of a strut support mount prior to installation in a deck fitting.
Figure 18:
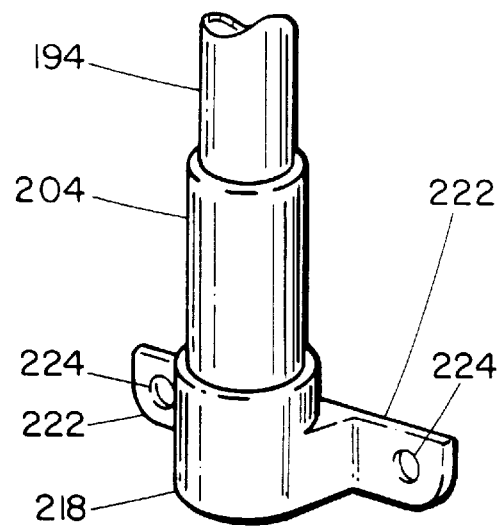
FIG. 18 is a side view of the strut support mount installed in the deck fitting of FIG. 17

FIGS. 17 and 18 show the strut support mount 204 having cup 214 for receiving end 216 of the strut 194 thereinto, for supporting the strut 194 therein. Deck fitting 218 has cup 220 for inserting and mounting the strut support mount 204 thereinto, and supports and mounts the strut support mount 204 onto the deck 198. FIGS. 17 and 18 show the strut support mount 204 and the deck fitting 218 prior to and after installation of the strut support mount 204 into the deck fitting 218, respectively. The deck fitting 218 also has tabs 222, the tabs 222 having holes 224 for inserting screws therethrough, for side mounting and fastening the deck fitting 218 to a side of the deck 198. The strut support mount 204 and the deck fitting 218 may be of aluminum, stainless steel, brass, or other suitable corrosion resistant material.

Figure 19:
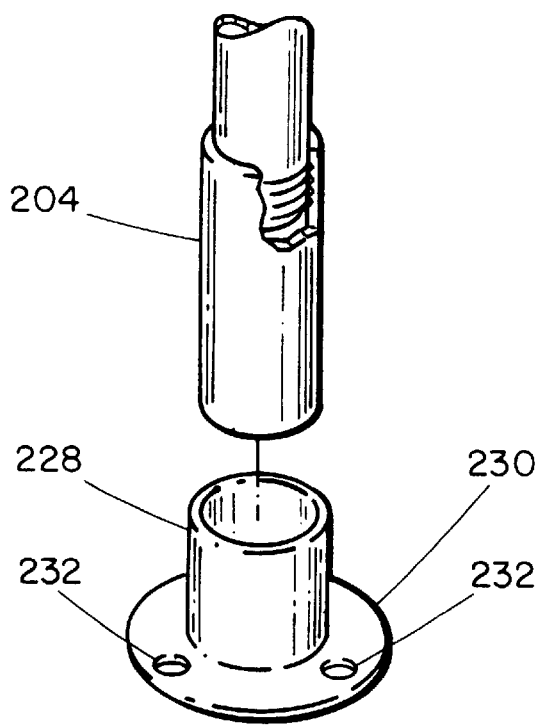
FIG. 19 is a side view of the strut support mount prior to installation in an alternate deck fitting.
Figure 20:
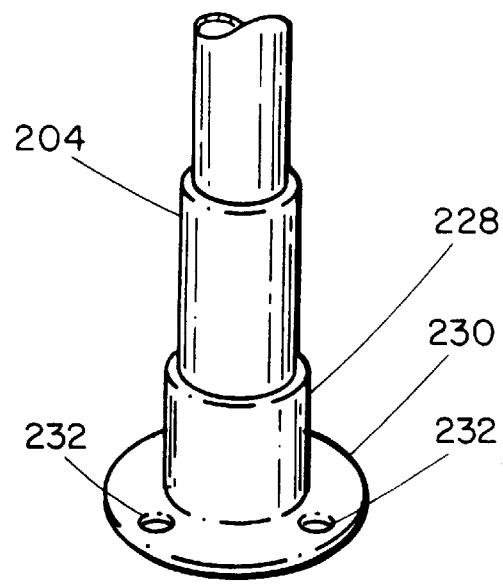
FIG. 20 is a side view of the strut support mount installed in the alternate deck fitting of FIG. 19.

FIGS. 19 and 20 show the strut support mount 204 prior to and after installation in alternate deck fitting 228, which is substantially the same as the deck fitting 218 shown in FIGS. 17 and 18, except that the deck fitting 228 has base plate 230, the base plate 230 having holes 232 for inserting screws therethrough, for top mounting and fastening the deck fitting 228 onto the deck 198.

Figure 21:
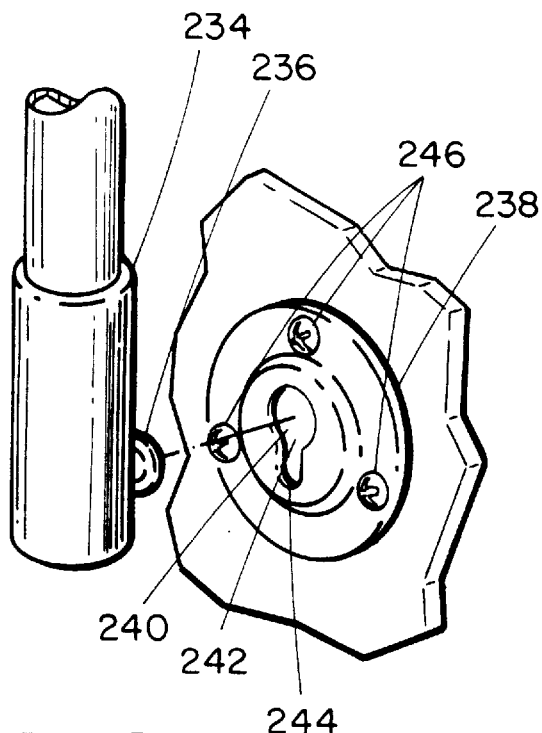
FIG. 21 is a side view of an alternate strut support mount prior to installation in an alternate deck fitting.
Figure 22:
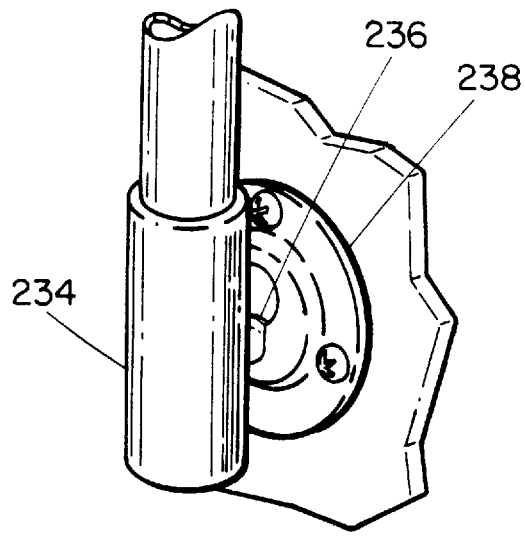
FIG. 22 is a side view of the alternate strut support mount installed in the alternate deck fitting of FIG. 21.

An alternate version of a strut support mount 234 shown in FIGS. 21 and 22 is substantially the same as the strut support mount 204 shown in FIGS. 17 and 18, except that the strut support mount 234 has a screw head shaped hook 236 protruding therefrom for removably mounting and fastening to deck fitting 238, which is adjoined to the deck 198. The deck fitting 238 has keyhole 240 with large hole portion 242 for removably receiving the screw head shaped hook 236 therethrough, and small hole portion edges 244 for removably mounting, resting, and fastening the screw head shaped hook 236 thereto. The deck fitting 238 also has holes for inserting screws 246 therethrough and mounting the deck fitting 238 to the deck 198 therewith.

Figure 23:
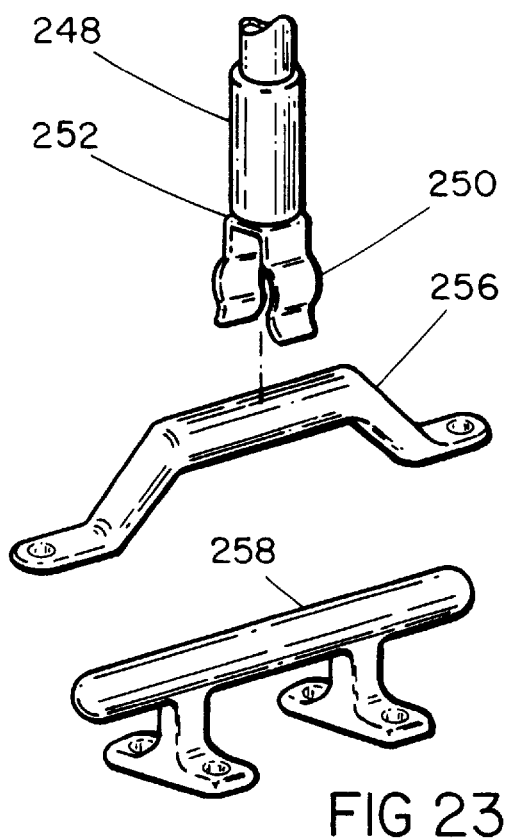
FIG. 23 is a side view of another alternate strut support mount prior to installation in other alternate deck fittings.
Figure 24:
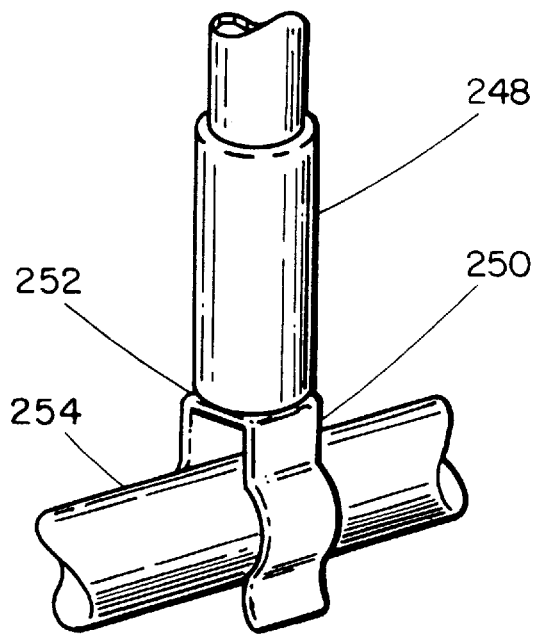
FIG. 24 is a side view of the other alternate strut support mount installed in one of the alternate deck fittings of FIG. 23.
Figure 25:
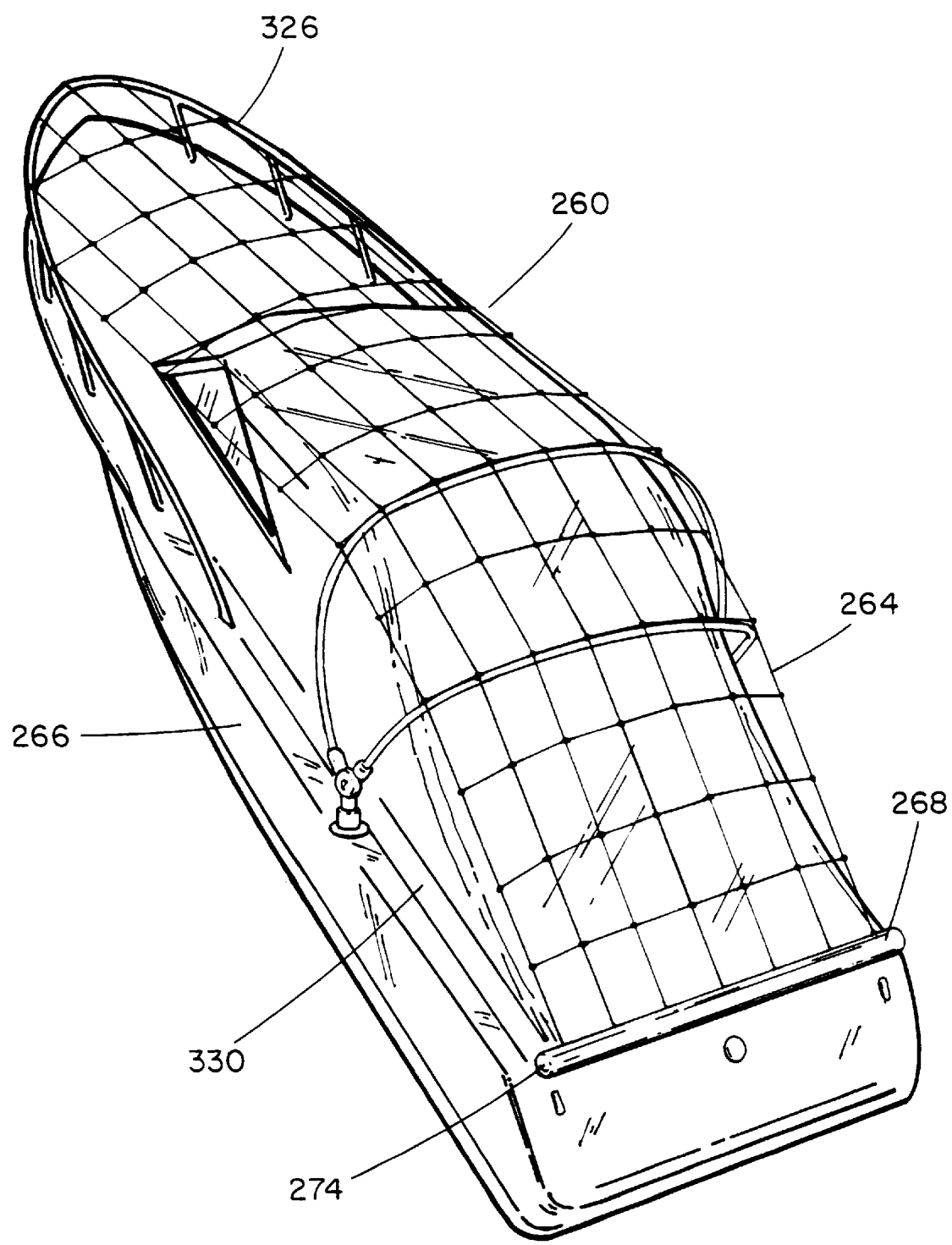
FIG. 25 is a perspective view of an alternate embodiment of a sea bird marine craft protector, constructed in accordance with the present invention, installed on a marine craft.
Figure 26:
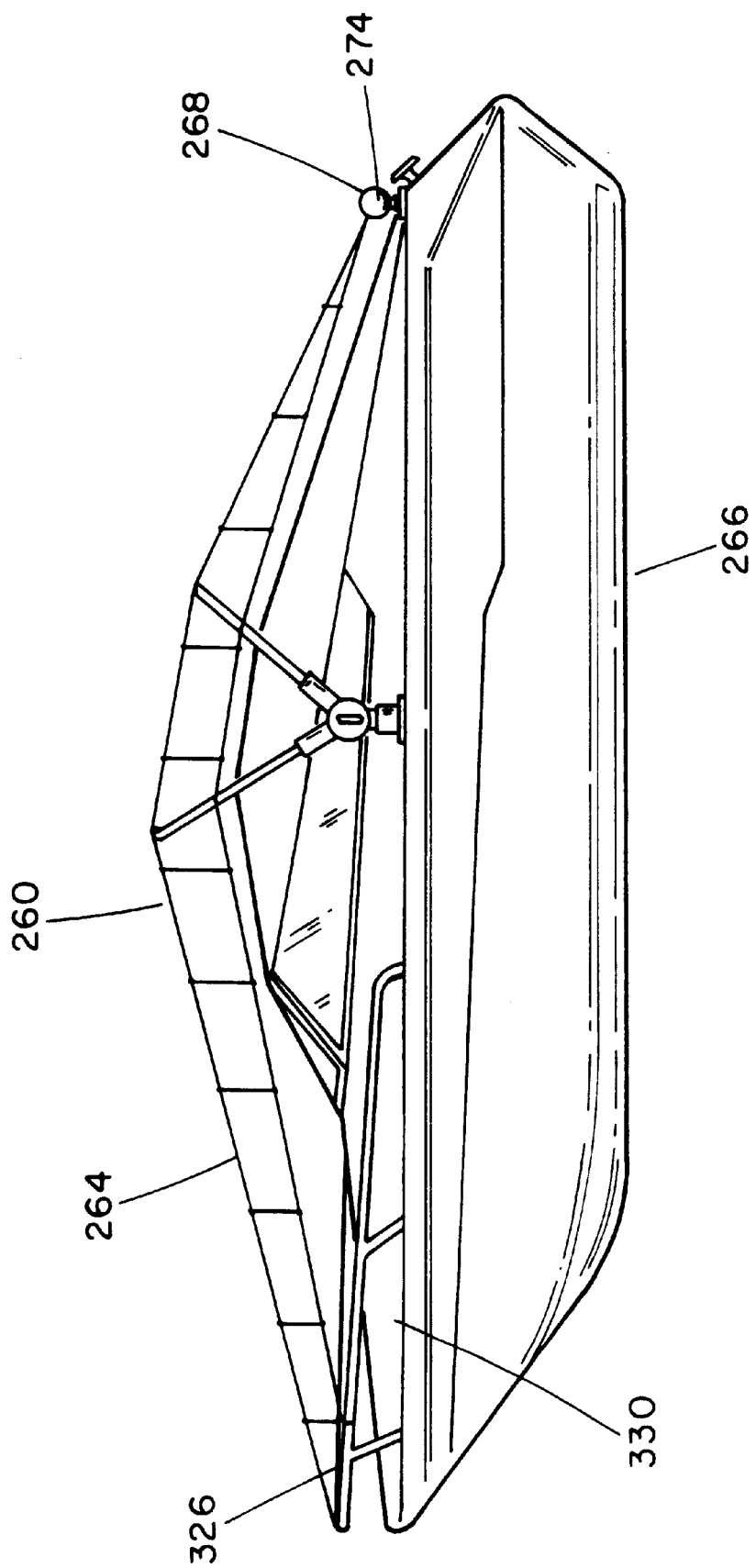
FIG. 26 is a side view of the alternate embodiment of the sea bird marine craft protector of FIG. 25, installed on the marine craft.
Figure 27:
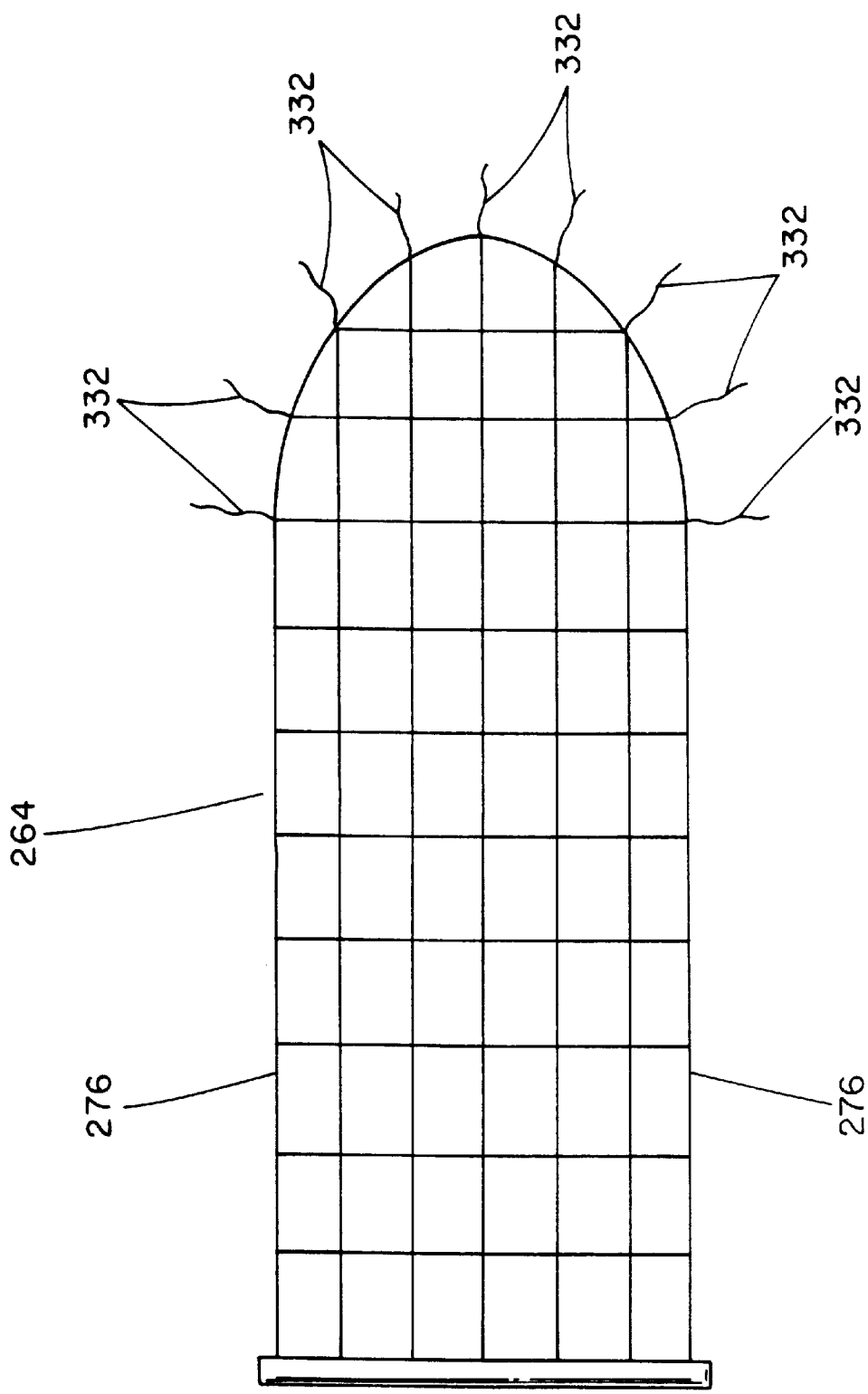
FIG. 27 is a top view of a protector net and reel housing of the sea bird marine craft protector of FIG. 25 prior to installation on the marine craft.
Figure 28:
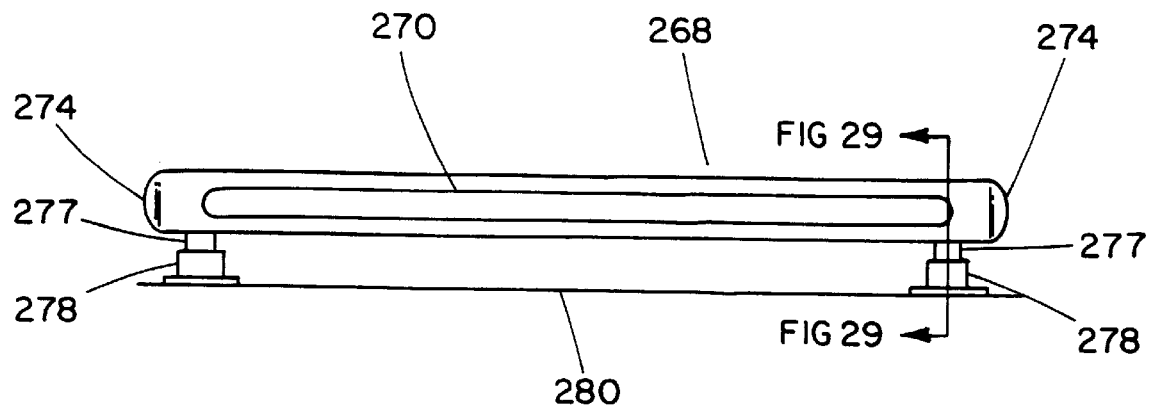
FIG. 28 is a front view of the reel housing reel of the sea bird marine craft protector of FIG. 25.
Figure 29:
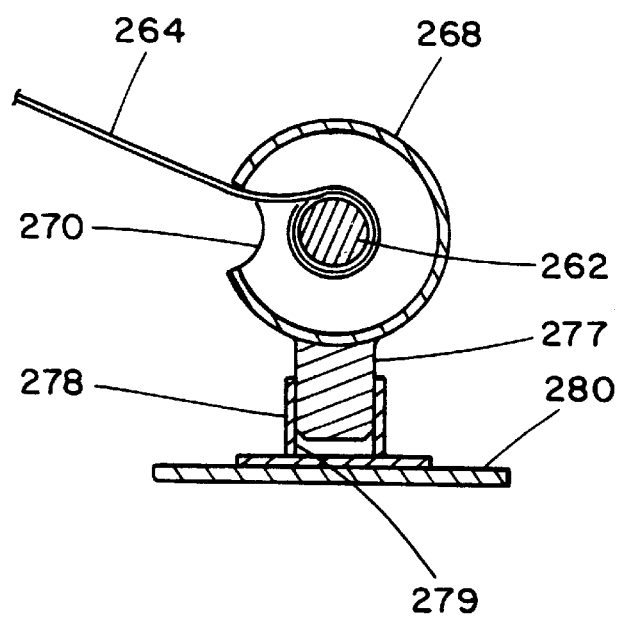
FIG. 29 is a side section view of the reel housing, reel, and a portion of the protector net of FIG. 25.
Figure 30:
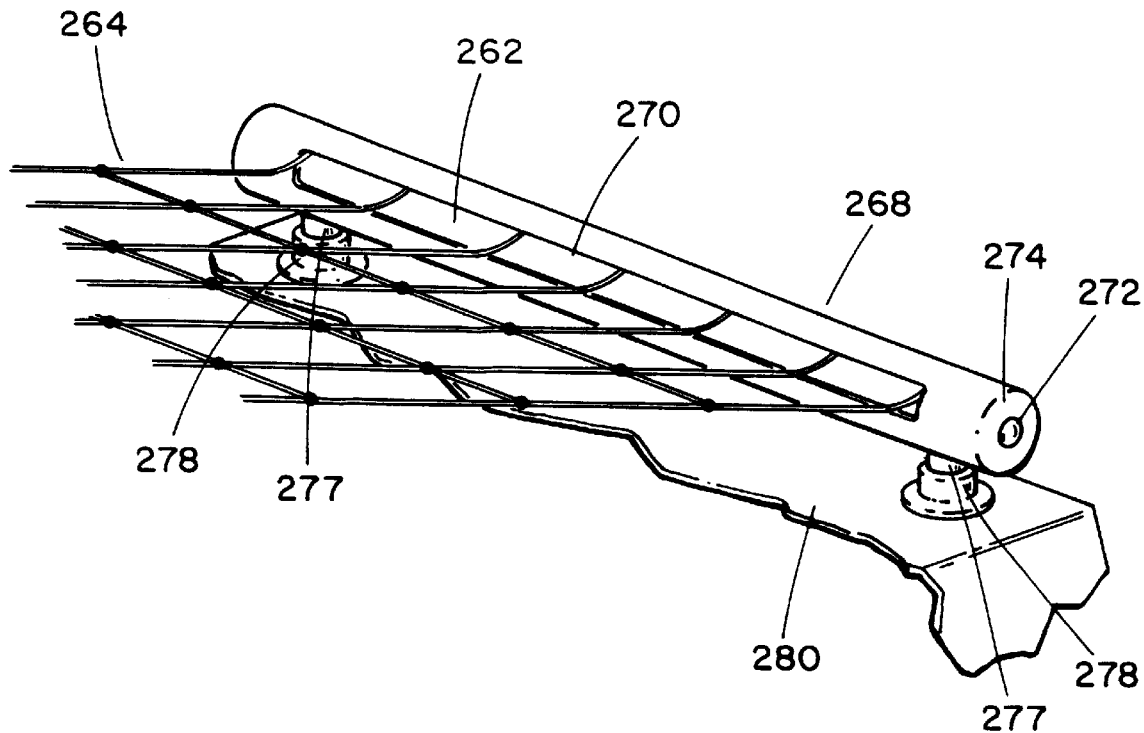
FIG. 30 is a perspective view of the reel housing of FIG. 28, the reel, and the portion of the protector net installed on deck at stern of the marine craft.

An alternate version of a strut support mount 248 shown in FIGS. 23 and 24 is substantially the same as the strut support mount 204 shown in FIGS. 17 and 18, except that the strut support mount 248 has spring clip 250 adjoined to bottom 252 of the strut support mount 248 for mounting and fastening the strut support mount 248 to alternate deck fittings 254, 256, 258, respectively, which may be alternatively fastened to the deck 198.

FIGS. 25–31 show an alternate embodiment of a sea bird marine craft protector 260, which is substantially the same as the sea bird marine craft protector 10, except that the sea bird marine craft protector 260 has reel 262, which facilitates installation and removal of protector net 264 on and off marine craft 266, respectively, and storage of the protector net 264 when not in use.

The protector net 264 is let out from the reel 262 when the protector net 264 is installed on the marine craft 266 and wound up on the reel 262 when the protector net 264 is uninstalled from the marine craft 266. The reel 262 has housing 268 for storing the protector net 264 therein and thereon the reel 262 when not in use and protecting the protector net 264 from the weather. The reel 262 has optional crank (not shown) and/or optional spring loaded ratchet (not shown) or may be optionally motor driven to facilitate letting out and winding up the protector net 264 on the reel 262. The housing 268 has slot 270 for passing the protector net 264 therethrough. The reel 262 is mounted on axle 272, which is rotationally affixed to ends 274 of the housing 268. The protector net 264 has substantially parallel sides 276 for ease of entry and exit from the slot 270 and to facilitate rolling up the protector net 264 on the reel 262.

The housing 268 has mounting members 277 adjoined thereto. Deck fittings 278 having cups 279 are mounted thereonto stern deck 280 of the marine craft 266. The mounting members 277 are removably inserted and mounted thereinto the cups 279 of the deck fittings 278. The reel 262 and the accompanying housing 268 may be optionally left in place or removed from the deck fittings 278, when the protector net 264 is rolled up on the reel 262 for storage and not in use.

Figure 31:
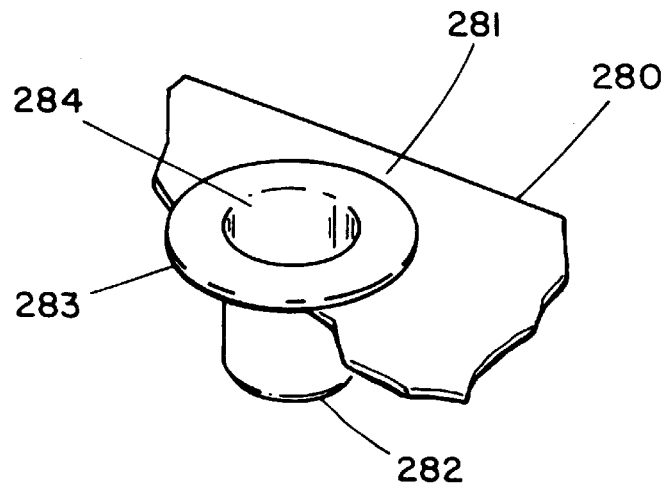
FIG. 31 is a perspective view of a flush mounted deck fitting.
Figure 32:
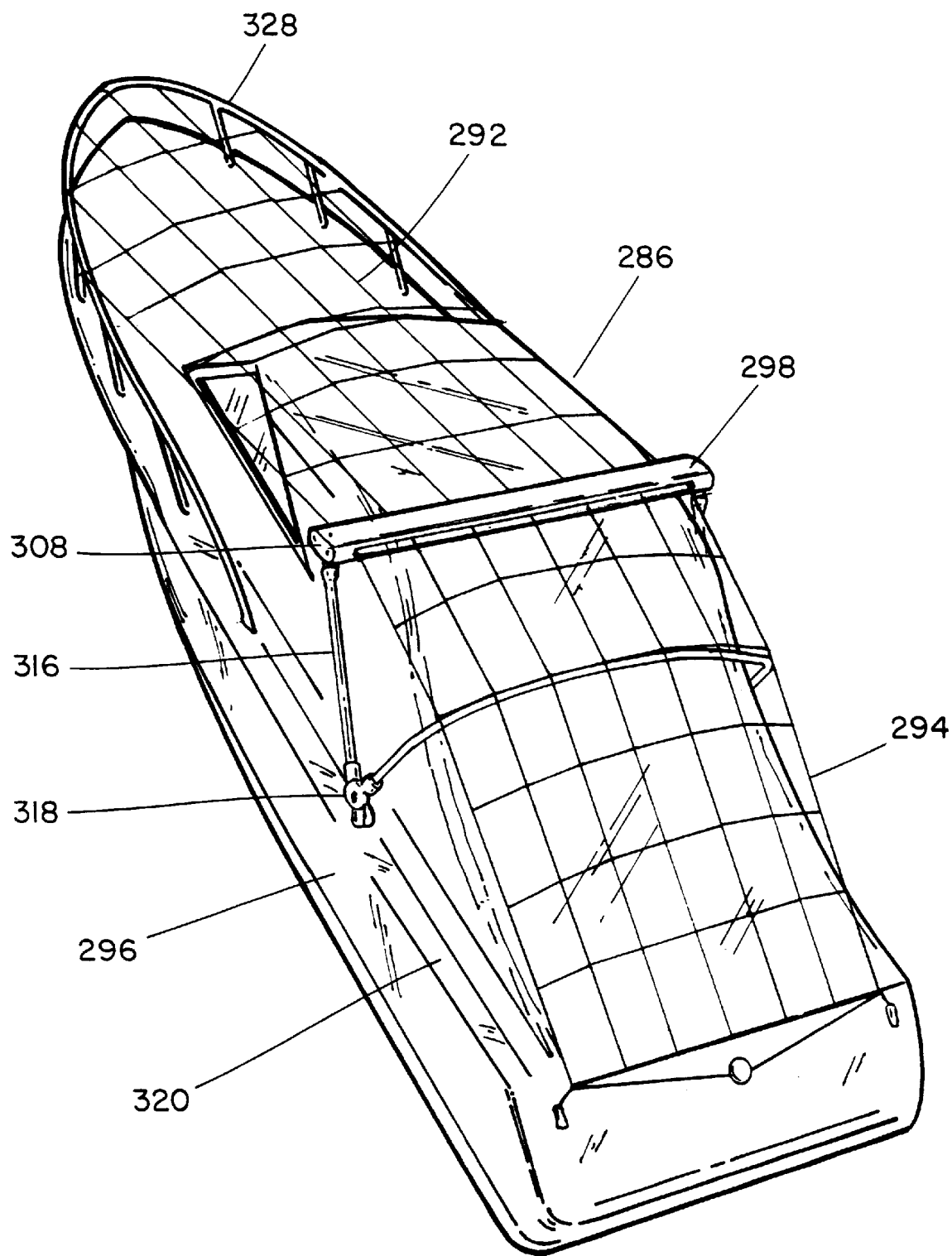
FIG. 32 is a perspective view of an alternate embodiment of a sea bird marine craft protector, constructed in accordance with the present invention, installed on a marine craft.
Figure 33:
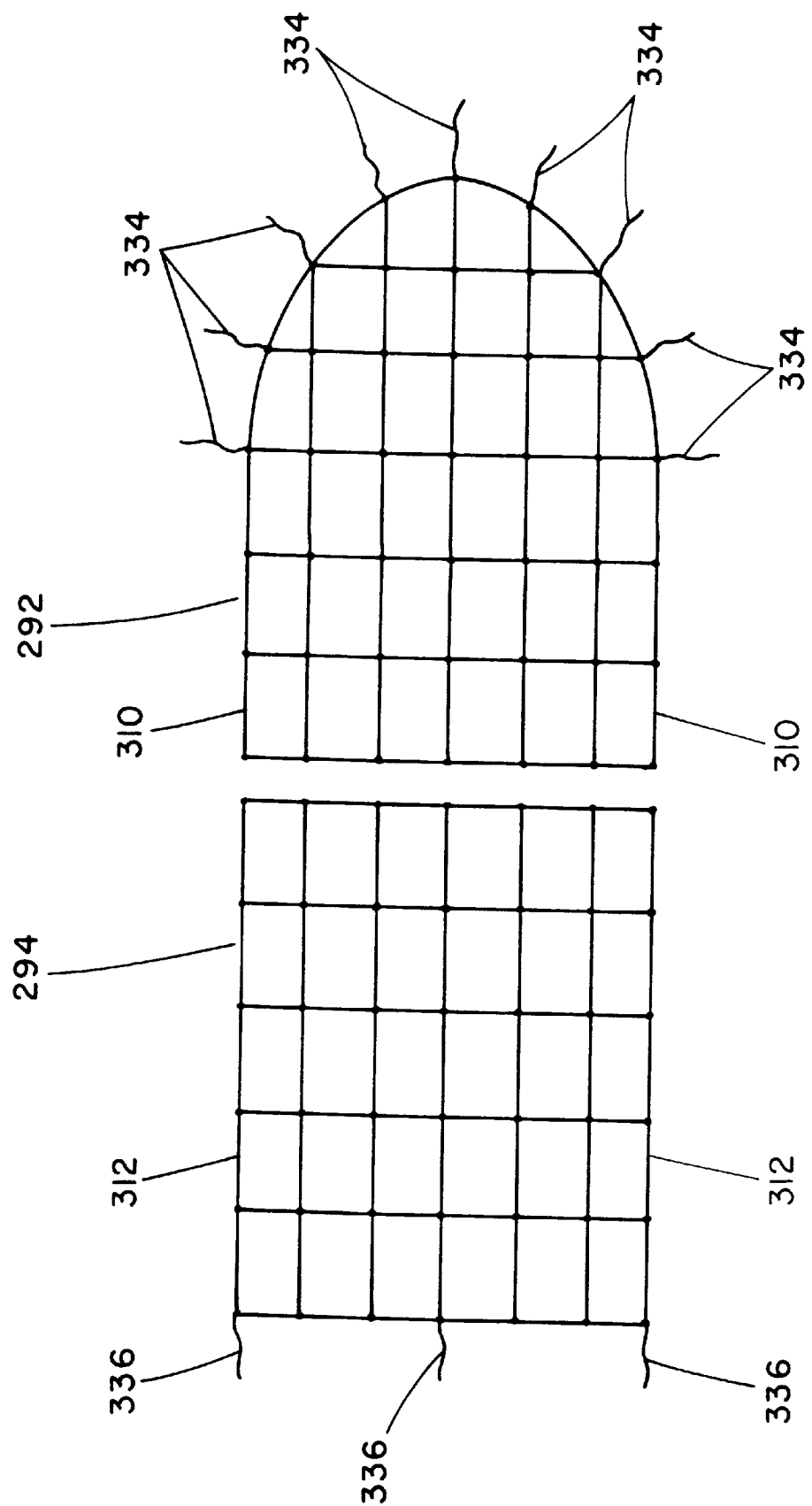
FIG. 33 is a top view of protector net portions of the sea bird marine craft protector of FIG. 32 prior to installation on the marine craft.

FIG. 31 shows a flush mounted deck fitting 281, which may be used as an alternate to the deck fitting 278. The deck fitting 281 has receiving cup 282 adjoined to plate 283, the plate having hole 284. The receiving cup 282 is mounted thereinto the stern deck 280, and the plate 283 is flush mounted onto the stern deck 280. The mounting members 277 are removably inserted and mounted thereinto the receiving cups 282 of the flush mounted deck fittings 281.

FIGS. 32–37 show an alternate embodiment of a sea bird marine craft protector 286, which is substantially the same as the sea bird marine craft protector 260, except that the sea bird marine craft protector 286 has reels 288 and 290 for letting out and winding up protector net portions 292 and 294, respectively forward and aft of the reels 288 and 290, respectively. The reels 288 and 290 facilitate installation and removal of the protector net portions 292 and 294, respectively on and off marine craft 296, respectively, and storage of the protector net portions 292 and 294 when not in use.

The protector net portions 292 and 294 are let out from the reels 288 and 290, respectively when the protector net portions 292 and 294 are installed on the marine craft 296 and wound up on the reels 288 and 290, respectively when the protector net portions 292 and 294 are uninstalled from the marine craft 296, respectively. The reels 288 and 290 have housing 298 for storing the protector net portions 292 and 294, therein and thereon the reels 288 and 290, respectively when not in use and protecting the protector net portions 292 and 294 from the weather. The reels 288 and 290 have optional cranks (not shown) and/or optional spring loaded ratchets (not shown) or may be optionally motor driven to facilitate letting out and winding up the protector net portions 292 and 294 on the reels 288 and 290, respectively. The housing 298 has slots 300 and 302 for passing the protector net portions 292 and 294 therethrough, respectively. The reels 288 and 290 are mounted on axles 304 and 306, respectively, which are rotationally affixed to ends 308 of the housing 298. The protector net portions 292 and 294 have substantially parallel sides 310 and 312, respectively for ease of entry and exit from the slots 300 and 302, respectively and to facilitate rolling up the protector net portions 292 and 294 on the reels 288 and 290, respectively.

The housing 298 has mounting members 314 adjoined thereto. Strut members 316 having holes (not shown) are mounted thereinto strut support mounts 318, which are mounted onto deck 320 of the marine craft 296. The housing mounting members 314 having spring loaded buttons 322, are releasably mounted thereinto the strut members 316, the spring loaded buttons protruding therethrough the strut members holes. The reels 288 and 290 and the accompanying housing 298 may be optionally left in place or removed from the strut members 316, when the protector net portions 292 and 294 are rolled up on the reel 288 and 290, respectively for storage and not in use.

Figure 38:
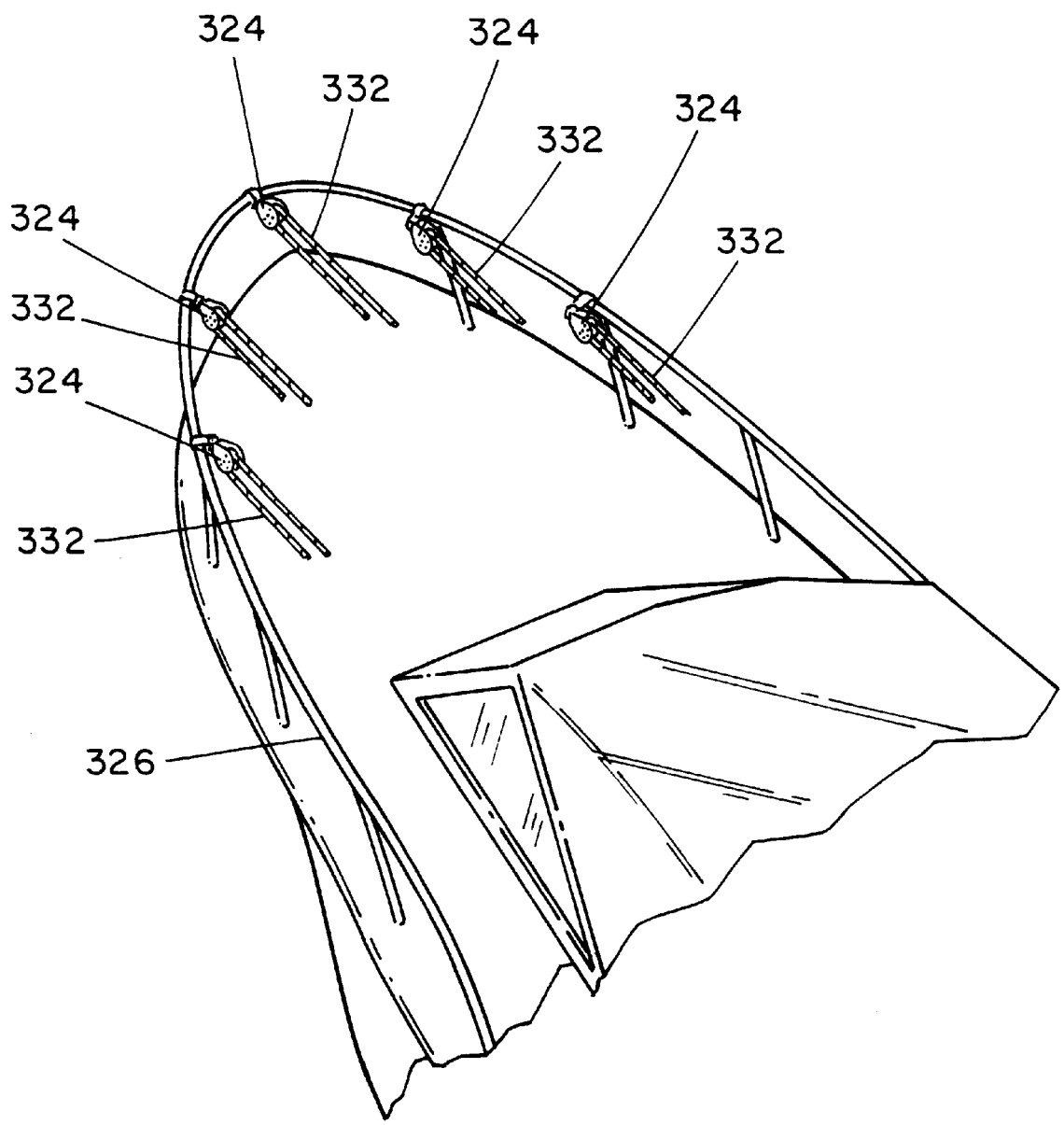
FIG. 38 is a perspective view of optional protector net pulleys of the sea bird marine craft protector of FIGS. 25 and 32.
Figure 39:
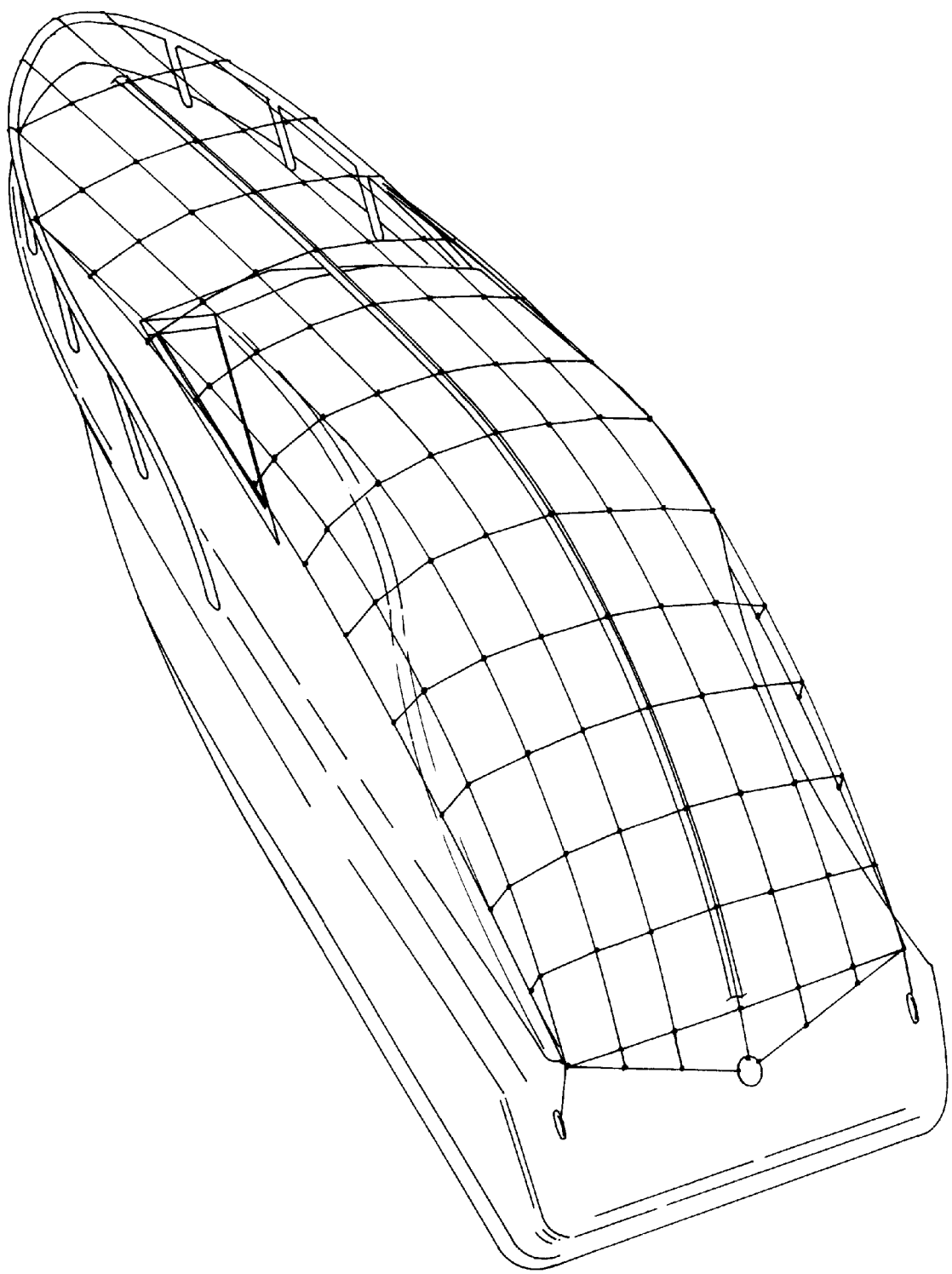
FIG. 39 is a perspective view of an alternate embodiment of a sea bird marine craft protector, constructed in accordance with the present invention, installed on a marine craft, the sea bird marine craft protector having a strut having ends mounted on opposing ends of the marine craft.

FIG. 38 shows optional protector net pulleys 324, which may be used with the sea bird marine craft protectors 260 and 286. The optional protector net pulleys 324 are mounted at selected locations on the marine craft 266 and 296 to facilitate easy personnel access, entrance, and egress of personnel from the marine craft 266 and 296, and remote fastening, tensioning, installation and removal of the protector net 264 and the protector net portions 292 and 294 from the marine craft 266 and 296. The pulleys 324 may be mounted on rails 326 and 328 on deck 330 and the deck 320 of the marine craft 266 and 296, respectively.

Selected ties 332 of the protector net 264 and selected ties 334 and 336 (not shown in FIG. 38) of the protector net portions 292 and 294 may be remotely fastened and the protector net 264 and the protector net portions 292 and 294 may be remotely tensioned, using the pulleys 324. The ties 332 of the protector net 264 and the ties 334 and 336 of the protector net portions 292 and 294 may be typically twice the length of the respective marine craft 266 and 296 to facilitate installation and removal of the protector net 264 and the protector net portions 292 and 294 on and off the marine craft 266 and 296 by personnel located remotely from as well as on the marine craft 266 and 296. The ties 332 of the protector net 264 and the ties 334 of the protector net portions 292 and 294 may be tied down to existing cleats (not shown) on the marine craft 266 and 296.

Although the present invention has been described in considerable detail with reference to certain preferred versions thereof, other versions are possible. Therefore, the spirit and scope of the appended claims should not be limited to the description of the preferred versions contained herein.

What is claimed is:

1. A sea bird marine craft protector, comprising:
   an elevated protector net for preventing sea birds from landing on a marine craft;
   at least one support having ends adapted to be opposingly mounted on said marine craft; and
   fasteners for fastening said protector net to said marine craft.

2. The sea bird marine craft protector according to claim 1, wherein said protector net is adapted to be elevated to a minimum height greater than said sea bird's leg length above deck and superstructure of said marine craft.

3. The sea bird marine craft protector according to claim 1, wherein said protector net has a mesh smaller than said sea bird's body width.

4. The sea bird marine craft protector according to claim 1, wherein said support is a strut.

5. The sea bird marine craft protector according to claim 1, wherein said support has ends adapted to be mounted on opposing sides of said marine craft.

6. The sea bird marine craft protector according to claim 4, further comprising strut support mounts, said strut support mounts adapted to be mounted on said marine craft, for mounting ends of said strut thereto.

7. The sea bird marine craft protector according to claim 6, wherein further said strut support mounts are adjustable for positioning said struts on said marine craft.

8. The sea bird marine craft protector according to claim 7, wherein further said strut support mounts are angularly adjustable for positioning said struts on said marine craft.

9. The sea bird marine craft protector according to claim 4, wherein said strut is adjustable for adjusting height of said protector net above said marine craft.

10. The sea bird marine craft protector according to claim 4, wherein said strut is adjustable for adjusting span of said strut.

11. The sea bird marine craft protector according to claim 4, wherein said strut is bendable for adjusting span of said strut.

12. The sea bird marine craft protector according to claim 4, wherein said strut is resiliently bendable for adjusting span of said strut.

13. The sea bird marine craft protector according to claim 1, wherein said protector net is of a resilient material.

14. The sea bird marine craft protector according to claim 13, wherein said resilient material is rubber.

15. The sea bird marine craft protector according to claim 13, wherein said resilient material is nylon.

16. The sea bird marine craft protector according to claim 4, wherein said strut has ends adapted to be mounted on opposing ends of said marine craft.

17. The sea bird marine craft protector according to claim 1, wherein further said sea bird marine craft protector is removably installable on said marine craft.

18. The sea bird marine craft protector according to claim 1, further comprising at least one reel for letting out and winding up said protector net.

19. The sea bird marine craft protector according to claim 18, wherein said at least one reel is mounted at substantially stern of said marine craft.

20. The sea bird marine craft protector according to claim 18, wherein said at least one reel is mounted at substantially amidships of said marine craft.

21. The sea bird marine craft protector according to claim 18, wherein said at least one reel is elevated above said superstructure of said marine craft.

22. The sea bird marine craft protector according to claim 18, wherein said at least one reel is mounted on said support of said marine craft.

23. The sea bird marine craft protector according to claim 18, wherein said at least one reel is removably mounted on said marine craft.

24. The sea bird marine craft protector according to claim 18, wherein said at least one reel is removably mounted on said support.

25. The sea bird marine craft protector according to claim 18, wherein said at least one reel is housed within a housing, said housing having at least one slot, said protector net passing therethrough said slot.

26. The sea bird marine craft protector according to claim 1, wherein said protector net comprises at least two portions.

27. The sea bird marine craft protector according to claim 26, further comprising at least two reels for letting out and winding up said protector net portions.

28. The sea bird marine craft protector according to claim 26, wherein said at least two reels are housed within at least one housing, said at least one housing having at least one slot, said protector net portions passing therethrough said at least one slot.

29. The sea bird marine craft protector according to claim 1, further comprising at least one pulley mounted on said marine craft for tensioning and fastening said protector net.

30. A sea bird marine craft protector, comprising:
   an elevated protector net for preventing sea birds from landing on a marine craft;
   at least one strut having ends adapted to be opposingly mounted on said marine craft; and
   fasteners for fastening said protector net to said marine craft.

31. The sea bird marine craft protector according to claim 30, wherein said strut has ends adapted to be mounted on opposing sides of said marine craft.

32. The sea bird marine craft protector according to claim 30, wherein said strut has ends adapted to be mounted on opposing ends of said marine craft.

33. A sea bird marine craft protector, comprising:
   an elevated protector net for preventing sea birds from landing on a marine craft;
   a plurality of struts, each said strut spanning and having ends adapted to be opposingly mounted on said marine craft;
   strut mounting assemblies adapted to be opposingly mounted on said marine craft; and
   fasteners for fastening said protector net to said marine craft.

* * * * *